United States Patent
Appleman et al.

(10) Patent No.: US 7,600,154 B2
(45) Date of Patent: Oct. 6, 2009

(54) SYSTEM AND METHOD OF CALCULATING A PROJECTED SERVICE COST ASSESSMENT

(75) Inventors: Robert L. Appleman, Wake Forest, NC (US); David F. Champion, Durham, NC (US); Cary Frederick De Van, Cary, NC (US); Walter C. Metz, Jr., Raleigh, NC (US); David A. Sawin, Chapel Hill, NC (US); Hoyt C. Simmons, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 11/375,559

(22) Filed: Mar. 14, 2006

(65) Prior Publication Data

US 2007/0219838 A1    Sep. 20, 2007

(51) Int. Cl.
*G06F 11/00* (2006.01)
(52) U.S. Cl. .................... 714/26; 705/7; 705/8; 705/10
(58) Field of Classification Search .................. 714/26, 714/27, 31, 38; 705/7, 8, 10, 11
See application file for complete search history.

(56) References Cited

U.S. PATENT DOCUMENTS

| | | | | |
|---|---|---|---|---|
| 6,658,470 | B1 * | 12/2003 | deBardelaben | 709/224 |
| 6,765,593 | B2 * | 7/2004 | Simmons | 715/763 |
| 6,782,345 | B1 * | 8/2004 | Siegel et al. | 702/183 |
| 2007/0203762 | A1 * | 8/2007 | Cutler et al. | 705/5 |

* cited by examiner

*Primary Examiner*—Nadeem Iqbal
(74) *Attorney, Agent, or Firm*—Dillon & Yudell LLP

(57) ABSTRACT

A method, apparatus, and computer-usable medium for computing a serviceability assessment, calculating a preventative maintenance assessment, and in response to computing the serviceability and preventative maintenance assessments, computing a projected service cost assessment. A preferred embodiment of the present invention includes a processor, a data bus, and a computer-readable medium including a serviceability assessment tool. The serviceability assessment tool further includes a serviceability assessment module, a hardware installation assessment module, a preventative maintenance assessment module, and a projected service cost assessment module.

14 Claims, 13 Drawing Sheets

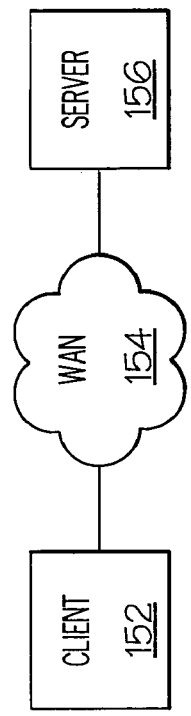
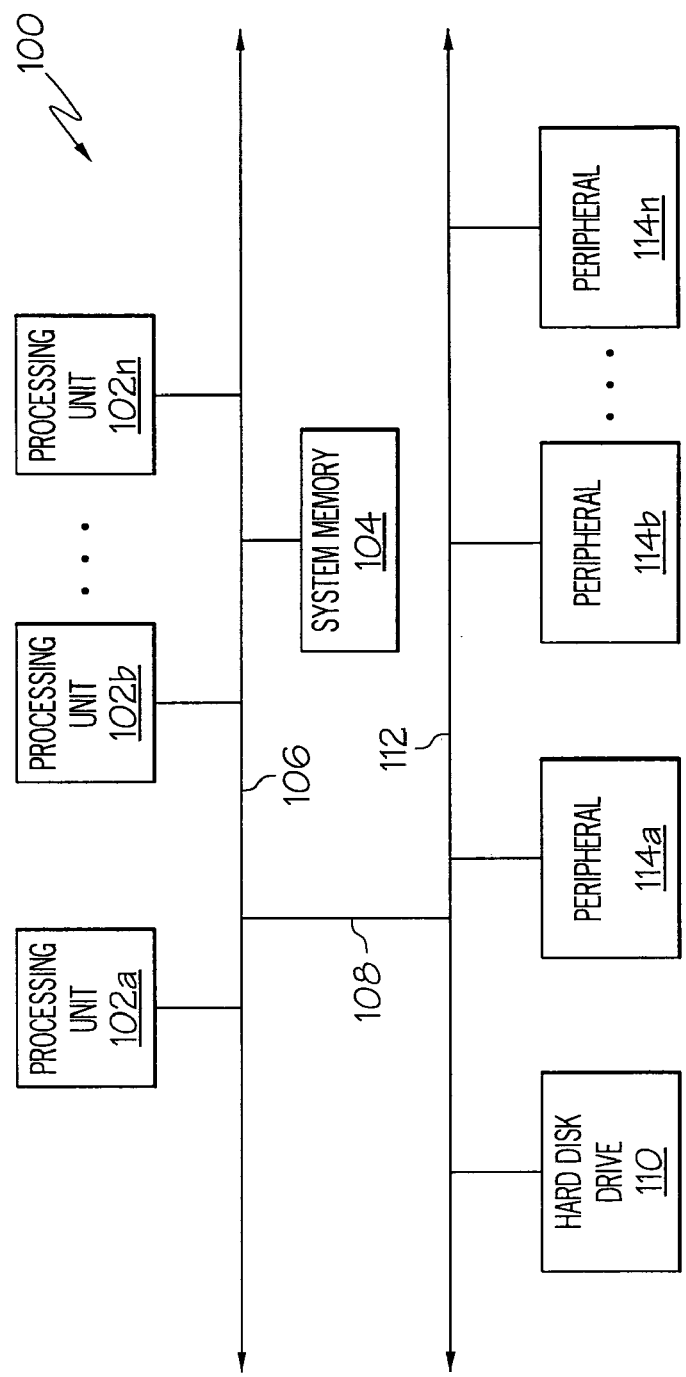

SYSTEM AND METHOD OF CALCULATING A PROJECTED SERVICE COST ASSESSMENT

BACKGROUND OF THE INVENTION

1. Technical Field

The present invention relates in general to the field of determining a projected service cost for a system.

2. Description of the Related Art

When making a purchase of a system, such as a computer system, consumers now demand that the system include a type of warranty program to protect the consumers' investment. Warranty programs utilized to protect consumer goods are well-known to those with skill in the art, but often, the terms of the warranty program (e.g., cost, period of coverage, etc.) were determined by subjective guessing and conjecture. Therefore, there is a need for a systematic and consistent way to determine the expected warranty costs of a product and to determine the prime culprits of high warranty costs in a system design.

SUMMARY OF THE INVENTION

The present invention includes a method, apparatus, and computer-usable medium for computing a serviceability assessment, calculating a preventative maintenance assessment, and in response to computing the serviceability and preventative maintenance assessments, computing a projected service cost assessment. A preferred embodiment of the present invention includes a processor, a data bus, and a computer-readable medium including a serviceability assessment tool. The serviceability assessment tool further includes a serviceability assessment module, a hardware installation assessment module, a preventative maintenance assessment module, and a projected service cost assessment module.

In a preferred embodiment of the present invention, a projected service cost assessment is calculated by first assessing the serviceability of each part of the system. The system parts are classified as $1^{st}$ tier consumer replaceable units (CRUs), $2^{nd}$ tier CRUs, or non-CRUs. The cost of preventative maintenance of the system is assessed. The projected service cost assessment is calculated from the result of the serviceability assessment and the preventative maintenance assessment.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, wherein:

FIG. 1A is a block diagram depicting an exemplary network in which a preferred embodiment of the present invention may be implemented;

FIG. 1B is a block diagram illustrating an exemplary data processing system in which a preferred embodiment of the present invention may be implemented;

DETAILED DESCRIPTION OF A PREFERRED EMBODIMENT

Figure 2:
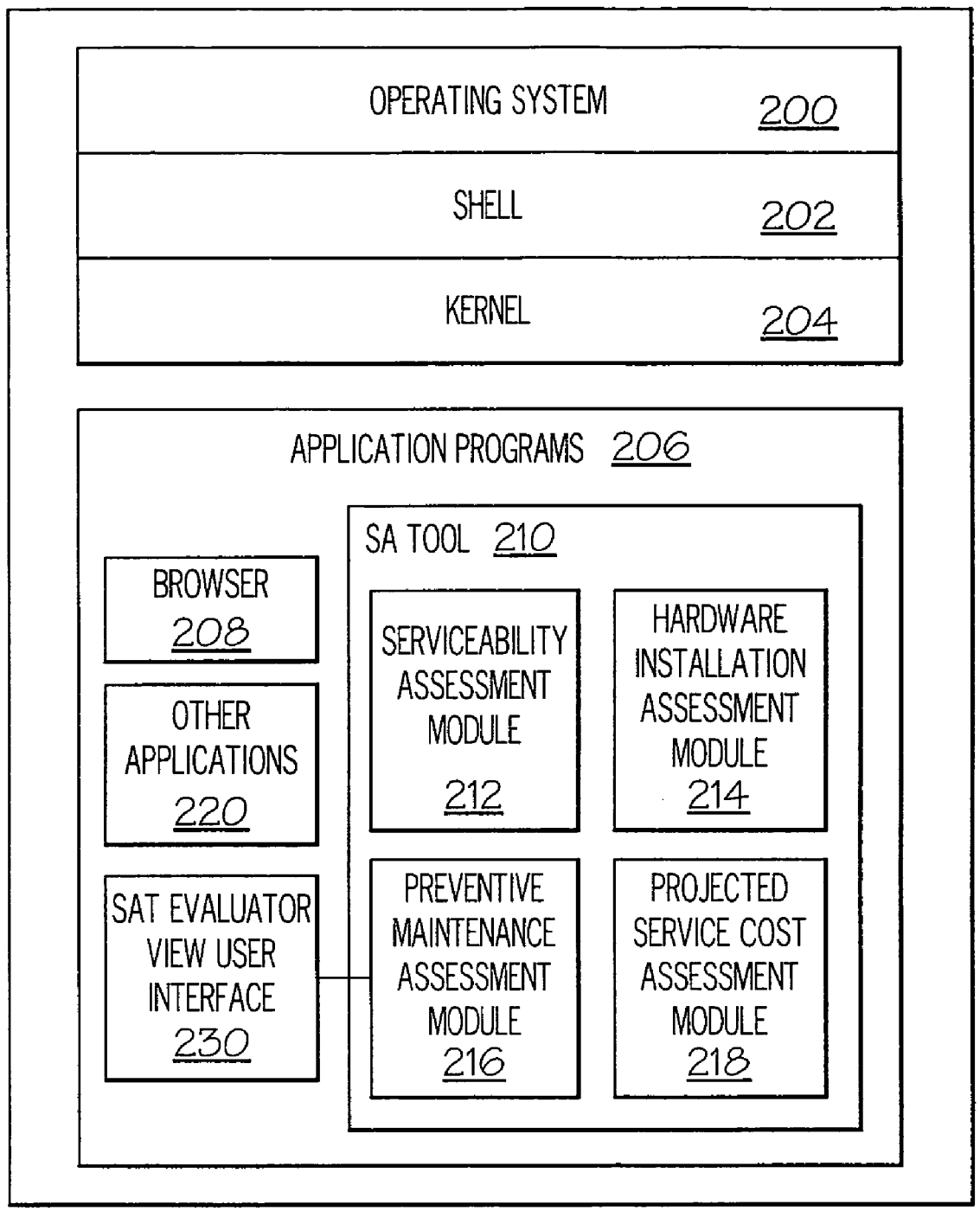
FIG. 2 is a block diagram depicting exemplary contents of the system memory of an exemplary data processing system as illustrated in FIG. 1.

Referring now to the figures, and in particular, referring to FIG. 1A, there is depicted a block diagram of an exemplary network 150 in which a preferred embodiment of the present invention may be implemented. As illustrated, network 150 includes client 152, wide-area network 154, and server 156. Client 152 and server 156 are preferably implemented as computer systems, such as exemplary data processing system 100 depicted in FIG. 1B. Wide-area network (WAN) 154 may be implemented as the Internet or any other type of wide-area network.

Referring now to FIG. 1B, there is illustrated a block diagram of an exemplary data processing system 100 in which a preferred embodiment of the present invention may be implemented. As illustrated, data processing 100 includes a collection of processing units 102a-n that are coupled to a system memory 104 via a system interconnect 106. System interconnect 106 is further coupled to peripheral interconnect 112 via mezzanine interconnect 108. As well-known to those with skill in the art, peripheral interconnect can be implemented by any variety of interconnects including, but not limited to, peripheral component interconnect (PCI) and accelerated graphics port (AGP). Coupled to peripheral interconnect 112 is hard disk drive 110, utilized by data processing system 100 as a mass storage device, and a collection of peripherals 114a-n.

Those skilled in the art will appreciate that data processing system 100 can include many additional components not specifically illustrated in FIG. 1. Because such additional components are not necessary for an understanding of the present invention, they are not illustrated in FIG. 1 or discussed further herein. It should also be understood, however, that the enhancements to data processing system 100 to improve handling of shared resources provided by the present invention are applicable to data processing systems of any system architecture and are in no way limited to the generalized multi-processor architecture or symmetric multi-processing (SMP) architecture illustrated in FIG. 1.

With reference now to FIG. 2, there is depicted a block diagram of the contents of system memory 104 according to a preferred embodiment of the present invention. Operating system 200 includes a shell 202, for providing transparent user access to resources such as application programs 206.

Generally, shell 202 is a program that provides an interpreter and an interface between the user and operating system. More specifically, shell 202 executes commands that are entered into a command line user interface or from a file. Thus, shell 202 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 204) for processing. Note that while shell 202 is a text-based, line-oriented user interface, the present invention will equally well support other user interface modes, such as graphical, voice, gestural, etc.

As depicted, operating system 200 also includes kernel 204, which includes lower levels of functionality for operating system 200, including providing essential services required by other parts of operating system 200 and application programs 206, including memory management, process and task management, disk management, and mouse and keyboard management.

Application programs 206 include a browser 208. Browser 208 includes program modules and instructions enabling World Wide Web (WWW) client (e.g., data processing system 100) to send and receive network messages to the Internet utilizing HyperText Transfer Protocol (HTTP) messaging.

Application programs 206 in data processing system 100's system memory 104 also include serviceability assessment tool (SAT) 210, discussed in more detail in conjunction with FIG. 3, and other applications 214 (e.g., word processors, spreadsheets, databases, etc.).

The Serviceability Assessment Process is implemented by the Serviceability Assessment Tool (SAT) 210. Using SAT 210, a product planner can objectively evaluate the serviceability of a product at key milestones in the development process, from product conception to product ship. SAT 210 quantifies the combination of factors that affect warranty costs, including problem determination times, component remove and replace times, component costs, component replacement rates, and the percentage of components that can be replaced by customers. The latter factor relates to the cost savings benefits of product designs that incorporate customer replaceable units (CRUs), which is the key strategy for warranty cost reduction.

Besides using SAT 210 to implement the Serviceability Assessment Process, product planners use SAT 210 to estimate repair times that are input to the Service Cost Estimating Process.

SAT Product Assessments

Using the SAT Evaluator view user interface (UI) 220, a product planner inputs product parameters, answers overall product questions, and answers questions about each individual field replaceable unit (FRU) and system microcode component. The questions address serviceability, hardware installation, and preventive maintenance. With this user-provided product data and imbedded brand data, SAT produces the four product assessments:

1. For the Serviceability Assessment, SAT 210 (via serviceability assessment module 212) computes scores that reflect the comparison of per-incident and per machine month (MM) repair times for FRUs and system microcode components against objective targets, taking into account time saved by designating some FRUs as CRUs.

2. For the Hardware Installation Assessment, SAT 210 (via hardware installation assessment module 214) computes scores that indicate whether or not a product is customer installable or installable only by qualified technicians.

3. For the Preventive Maintenance Assessment, SAT 210 (via preventive maintenance assessment module 216) computes cost per MM associated with scheduled preventive maintenance, where the maintenance intervals are determined by predictable service requirements such as those incurred by replacing worn parts or filters.

4. For the Projected Service Cost Assessment, SAT 210 (via projected service cost assessment module 218) computes the service cost per MM, which includes costs for parts, parts distribution, call center, labor, preventive maintenance, and microcode maintenance.

The Serviceability Assessment, the Hardware Installation Assessment, and the Preventive Maintenance Assessment can each be completed independent of the other four assessments. However, completing the Projected Service Cost Assessment depends upon first completing the Serviceability Assessment and the Preventive Maintenance Assessment.

SAT Business Case Analysis

With SAT 210, a product planner can define "what-if" business cases. A "what-if" analysis compares the plan-of-record Projected Service Cost Assessment with an alternative Projected Service Cost Assessment by quantifying the cost savings which would result from an alternative product design and service strategy, based on the alternative CRU content, component costs, component replacement rates, labor rates, or service channels.

SAT Administrator Responsibilities

The administration and integrity of SAT is controlled by an SAT administrator, who uses the SAT Evaluator view UI 220 to perform the following tasks 1-5.

1. Define the evaluation questions: The administrator works with human factors engineers, RAS engineers, and service planners to write and maintain the evaluation questions. Question definition includes the assignment of one or more timing adjustments (in minutes). Depending upon how a question is answered, one of its timing adjustments is used in computing the question's contribution to repair time (by either adding or subtracting time).

2. Assign threshold values in the CRU Threshold Table: Question definition also includes specifying which questions have a corresponding threshold value in the CRU Threshold Table.

3. Assign values to calibration constants: The administrator is responsible for calibrating SAT by assigning values to the calibration constants. There is a calibration constant for each subcategory of questions. "Mechanical Timing" and "Diagnostic" are example question subcategories. The calibration constant for a particular subcategory can be interpreted as the time in minutes which will result in a score of 90 for that subcategory.

4. Assign brand parameters: Using the SAT Evaluator view UI 220, the SAT administrator defines brands and assigns brand parameters, such as service channel distribution percentages, labor rates by service channel, and part distribution cost by service channel.

5. Distribute the Master file: The question data, brand data, CRU Threshold Table, and calibration constants are saved in a single file called the SAT master file. The SAT administrator is responsible for distributing each updated version of the SAT master file to the SAT evaluators.

6. Train and support end users: The administrator is responsible for providing SAT users with necessary SAT education and training.

SAT User (Evaluator) Responsibilities

The SAT Evaluator uses the SAT Evaluator view UI 220 to perform the following tasks:

1. Define products and evaluations. A product planner can define one or more products and multiple evaluations within each product. Each evaluation is typically done for a different phase in the development process. SAT automatically and transparently saves product and evaluation data on the evaluator's local disk drive.
2. Perform evaluations. An evaluation is performed by defining product FRUs, answering product level questions applying to all FRUs, answering questions applying to each individual FRU, and analyzing SAT reports for the four possible assessments. An evaluator can initialize an evaluation by copying the data from a previous evaluation, and can then make modifications in the new evaluation that reflect changes in the product.
3. Exporting evaluations. The evaluator can export product data to a file that another SAT user can import into his/her instance of SAT.
4. Updating the Global Database. The evaluator is responsible for exporting product serviceability assessment metrics to the global metrics file and sending the file to the person responsible for maintaining the Global Database.

Intrinsic Failure Rates and Replacement Rates

When defining a FRU, part, or system microcode component, the SAT user (evaluator) specifies an intrinsic failure rate and a replacement rate for the component. Both are measured in "incidents per machine month," and both are a projected average value over the first twelve months after installation. The intrinsic failure rate is the rate at which the component fails. The replacement rate is greater than the failure rate because, since problem determination procedures are not 100% effective, a component is sometimes replaced although it has not failed.

Per-Incident and Repair Action Terminology

The event of a product requiring and receiving service is called an "incident" or a "repair action". Repair activities are referred to as per-incident activities or per-repair-action activities. For example, "per-incident diagnostic time" or "diagnostic time per-repair-action" refers to the same elapsed time. Repair rates are typically specified in minutes per machine month (MM) and are computed by multiplying the per-incident repair time by the replacement rate per MM. For example, if the total repair time to service and replace a FRU is 60 minutes and the replacement rate is 0.0001 per MM, the repair rate is 0.006 minutes per MM.

SAT Metrics

SAT 210 computes individual component metrics and overall product metrics for FRUs and system microcode components. Most metrics are a per-incident repair time, a repair time per MM, a service cost per MM, or a score. Scores reflect comparisons to objective targets and are typically computed by translating a per-incident repair time or repair time per MM into a number between zero and 100, where lower times produce a higher score and higher times produce a lower score. An overall product per-incident (or per MM) repair time is computed by averaging individual FRU or system microcode per-incident (or per MM) repair times.

1. Individual FRU and Product FRU Scores

A Per-Incident Time Score (0-100) is a measure of per-incident-time for one of ten scales which measure aspects of repair time, such as mechanical timing, problem determination, etc.

A Serviceability (unweighted) Score (0-100) is a measure of FRU total per-incident repair time, "unweighted" by replacement rate and the affects of CRU content.

A Serviceability with Reliability Score (0-100) is a measure of FRU repair time per MM, which is the multiplication of FRU replacement rate per MM, and FRU total per-incident repair time.

A Serviceability with Reliability and CRU Score (0-100) is a measure of FRU CRU-adjusted repair time per MM, which is the multiplication of FRU replacement rate per MM, and FRU CRU-adjusted total per-incident repair time.

A Diagnostic Effectiveness Score (0-100) is the percent representation of the ratio of intrinsic failure rate to replacement rate 2. Individual and Product System Microcode Scores A Per-incident Time Score (0-100) is a measure of per-incident-time for each of eight scales (microcode update, etc.).

A Serviceability (unweighted) Score (0-100) is a measure of system microcode total per-incident repair time.

A Serviceability with Reliability Score (0-100) is a measure of system microcode repair time per MM, which is the multiplication of SM replacement rate per MM, and SM total per-incident repair time.

3. Individual CRU Status (non-CRU, Tier 1 CRU, or Tier 2 CRU). The CRU status used in the assessment(s) is the plan-of-record CRU status, unless SAT determines that the CRU criteria are not met, in which case the computed CRU status is used in the assessments.

4. Product CRU Content is the percent of repair incidents that involve Tier 1 and Tier 2 CRUs (presented for both plan-of-record and computed CRU status).

5. Projected Product Service Cost is the sum of the following product costs:

Parts Cost

Labor Cost

Preventive Maintenance Cost

Microcode Maintenance Cost

Parts Distribution Cost

Call Center Cost

6. Warranty Cost is the sum of the following product costs over a warranty period:

Parts Cost

Labor Cost

Preventive Maintenance Cost

Microcode Maintenance Cost

Parts Distribution Cost

Parts and Subassemblies

In addition to defining product FRUs, the SAT evaluator can define product parts and subassemblies. Parts are components such as a cover or bezel which have negligible failure rates. Subassemblies contain more than one FRU and are removed as if they were a single component. Because parts and subassemblies can be in the removal path of a FRU, SAT evaluator is presented with evaluation questions directed toward determining the difficulty of their removal.

Prerequisite Components

When defining a FRU, part, or subassembly, the SAT evaluator must specify the immediate prerequisite components in the component's removal path. From the immediate prerequisites for all FRUs, parts, and subassemblies, SAT can determine all prerequisite components for each FRU.

Question Categories

In the Rate Product section of the Evaluator view, the SAT user is presented with questions in the following four categories:
  Product
  Component Remove and Replace
  Microcode Update
  Problem Determination Questions in the Product category may address an overall product capability or a component capability. For component specific questions in the Product category, the question answer must be the same for all FRUs and/or all system microcode components. By putting a component specific question in the Product category, the question need be answered only once rather than once for every FRU and system microcode component.

Questions in the other three categories may have different answers for each component, so must be asked once for each component to which the question applies.

Question Subcategories

Each question also belongs in one and only one subcategory, and each subcategory belongs to one and only one category. The subcategories are used in determining the repair time scales to which the question applies (see Scales for Quantifying and Scoring Repair Times below and Appendices E and F). The subcategories are transparent to the SAT user when the user is answering questions. However, the subcategories are visible to the user in some of the reports, primarily the detailed serviceability assessment reports.

The checks in the following table indicate which category and subcategory of questions apply to each component type (FRU, Part, Subassembly, System Microcode).

|  |  | Component Type | | | |
| --- | --- | --- | --- | --- | --- |
| Question Category | Question Subcategory | FRU | Part | Sub-assembly | System Microcode |
| Product | System Diagnostic | ✓ |  |  | ✓ |
|  | System Remote Support | ✓ |  |  | ✓ |
|  | System Call Home | ✓ |  |  | ✓ |
|  | System Autonomic | ✓ |  |  | ✓ |
|  | Component Information Delivery | ✓ |  |  | ✓ |
|  | PD Information Delivery | ✓ |  |  | ✓ |
|  | Hardware Install Safety | ✓ |  |  |  |
|  | Hardware Install Installation | ✓ |  |  |  |
|  | Hardware Install Information | ✓ |  |  |  |
| Remove and Replace | Service Access | ✓ |  |  |  |
|  | Mechanical Timing | ✓ | ✓ | ✓ |  |
|  | Intuitiveness | ✓ | ✓ | ✓ |  |
|  | Component Replacement Instruction | ✓ |  |  |  |
|  | FRU Microcode | ✓ |  |  |  |
| Microcode Update | Code Load |  |  |  | ✓ |
|  | Code Load Instruction |  |  |  | ✓ |
| Problem Determination | Component Diagnostic | ✓ |  |  | ✓ |
|  | Component Remote Support | ✓ |  |  | ✓ |
|  | Component Call Home | ✓ |  |  | ✓ |
|  | Component Autonomic | ✓ |  |  | ✓ |
|  | PD Instruction | ✓ |  |  | ✓ |

Scales for Quantifying and Scoring Repair Times

SAT uses a set of ten scales for quantifying and scoring FRU repair times and a set of eight scales for quantifying and scoring system microcode repair times:

FRU Scales:

Mechanical Design
Remove and Replace
Microcode Update
Diagnostic
Autonomic
Remote Support
Problem Determination
Component Information
PD Information
Total System Microcode Scales:

Microcode Update
Diagnostic
Autonomic
Remote Support
Problem Determination
Microcode Information
PD Information
Total For each scale, SAT produces per-incident-time scores for individual FRUs and system microcode components and an "average" per-incident-time score for all FRUs and system microcode components. The score for each scale is derived from the sum of question timing values for specific question subcategories.

Global Calibration Constants

The SAT administrator has the responsibility of setting global calibration constants that apply to all brands. The global calibration constants are set in the Author view.

Each of the global calibration constants is associated with one or two question subcategories. Each of these calibration constants are used to transform a set of accumulated question timings into a score between 0 and 100. Each calibration constant can be interpreted as the "target value" of the accumulated question timings that will result in a score of 90 for the questions in the associated subcategory(s). The global calibration constants are grouped into those for FRUs, system microcode (SM), and hardware installation (HWI).

FRU Calibration Constants

Mechanical Timing
Intuitiveness
Component Information
Service Access
FRU Microcode
Diagnostic
Autonomic
Call Home
Remote Support
PD Information
SM Calibration Constants Code Load
Component Information
Diagnostic
Autonomic
Call Home
Remote Support
PD Information
HWI Calibration Constants Hardware Installation Safety
Hardware Installation Installation
Hardware Installation Information Increasing the value of calibration constant will raise the score, and decreasing the value of a calibration constant will lower the score. The equation for computing the score from the value of an accumulated question timing is linear for scores higher than 25. Thus, if a calibration constant is set at 6 minutes, an accumulated question timing value of 0 would result in a score of 100 for the associated questions; a timing value of 3 would result in a score of 95; a timing value of 6 would result in a score of 90; a timing value of 12 would result in score of 80; a timing value of 18 would result in a score of 70, etc.

Brand Calibration Constants

The SAT administrator also has the responsibility of setting brand-specific calibration constants that apply to an individual brand. The following brand-specific calibration constants are set in the SAT Brand view.

FRU Service Access Time
FRU Replacement Rate
System Microcode Replacement Rate
Tier 1 CRU Content Percent
Tier 1 CRU Acceptance Percent
Tier 2 CRU Content Percent
Tier 2 CRU Acceptance Percent The FRU Service Access Time calibration constant is associated with the Service Access subquestion category. The FRU Replacement Rate and System Microcode Replacement Rate are target values (for score=90) of FRU and System Microcode replacement rates per machine month respectively.

The Tier 1 and Tier 2 content and acceptance percent calibration constants must be in the range 0 to 100. The two content percent calibration constants are targets for the percent of FRUs that are Tier 1 and Tier 2 CRUs. The two acceptance percent calibration constants are targets for the percent of customer acceptance of the Tier 1 and Tier 2 CRUs.

Brand Parameters:

Brand Timing Parameters
   CE Travel Time (in minutes)
   Customer Interaction Time (in minutes)

Brand Financial Parameters
   Service Distribution Percentages:
      Percent of service calls handled by dealer (the rest are routed to manufacturer)
      Percent of manufacturer service calls routed to depot service
      Percent of manufacturer service calls resulting in customer replacement
      Percent of customer replacements that are Tier 1 CRUs
      Percent of customer replacements that are Tier 2 CRUs
   Distribution Cost Per Service Channel:
      Customer ($ per repair action)
      Dealer Onsite ($ per repair action)
      CE Onsite ($ per repair action)
      Depot Service ($ per repair action)
   Labor Rates Per Service Channel for each CRU Status (non-CRU, Tier 1, Tier 2):
      Customer ($ per repair action)
      Dealer Onsite ($ per repair action)
      CE Onsite ($ per repair action or $ per hour)
      Depot Service ($ per repair action)
   Call Center Cost Per Minute ($)
   Parts Takedown Percentage (x.xx)
   Labor Takedown Percentage (x.xx)

Calibration Constants
   FRU Service Access Time (in minutes)
   FRU Replacement Rate (per MM)
   System Microcode Replacement Rate (per MM)
   Tier 1 CRU Content Percent
   Tier 1 CRU Acceptance Percent
   Tier 2 CRU Content Percent
   Tier 2 CRU Acceptance Percent Product Parameters
   Product Name or Code Name
   Brand Identifier (defined by the administrator)
   Machine Type
   Project Volume—CURRENTLY NOT USED
   Labor Warranty Period (months)
   Parts Warranty Period (months)
   No Part Rate (per MM)
   Shutdown Times:
      Complete Shutdown/Reboot Time (in minutes)
      Partial Shutdown/Reboot Time (in minutes)
      FRU Shutdown Time (in minutes)
   Preventive Maintenance:
      Projected Usage (in POH per month or pages per month)
      Enable Preventive Maintenance (yes or no)
      PM Usage Cycle Driven by (usage or time)
   Microcode Maintenance:
      Number of Maintenance Activities Per Year
      Number of Maintenance Activities Per Year Requiring Travel
      Maintenance Activity Time (in minutes)
   Override Service Distribution Percentages:
      Same as Brand Service Distribution Percentages FRU Parameters
   FRU Name
   Designated CRU Status (Tier 1 CRU, Tier 2 CRU, or Non-CRU)
   Quantity
   Intrinsic Failure Rate (per machine month)
   Replacement Rate (per machine month)
   Failures Before Service
   Component Cost ($x.xx)
   Has Microcode (boolean)

CRU Determination Procedures:

CRUability Criteria

The CRU status of a FRU can be non-CRU, a Tier 1 CRU, or a Tier 2 CRU. Computations to determine CRU status are based on the answers to two types of FRU questions, designated "threshold" questions and "showstopper" questions. CRU threshold questions are questions relating to a number of connections or required tools. For each CRU threshold question defined in the Author view, there is a CRU threshold table entry where the Administrator can set Tier 1 and Tier 2 CRU threshold values for the brand.

The CRU threshold table in the Author view has three sets of Tier 1 and Tier 2 thresholds that do not correspond to specific questions. These sets have the following labels:
1. Total number of connections and tools
2. Total number of different connection and tool types
3. Mechanical design time A CRU threshold or showstopper question may be "active" or "inactive". It is active if it has no "parent" question or if its parent question has the answer that "activates" its subquestions. CRU showstopper questions that are inactive (regardless of their answers) are ignored in the CRU determination procedure.

The following procedure determines if a FRU qualifies for Tier 1 or Tier 2 CRU status:
1. For each CRU threshold question type, the answers for the FRU and possibly its prerequisite removals are summed and compared to the corresponding Tier 1 and Tier 2 threshold table values for that question type. (When comparing a value against a threshold table value, if the value does not exceed the Tier 1 threshold, the FRU meets the Tier 1 CRU criterion. If the Tier 1 threshold is exceeded but the Tier 2 threshold is not exceeded, the FRU meets the Tier 2 CRU criterion.)
2. The total count of all CRU threshold question answers for the FRU and its prerequisite removals is compared to the "Total number of connections and tools" Tier 1 and Tier 2 thresholds.
3. For each CRU threshold question type (e.g. cable, screws), the FRU and its prerequisite removals are checked for at least one non-zero question answer. The total number of question types with at least one non-zero answer is computed and compared to the "Total number of different connection and tool types" Tier 1 and Tier 2 thresholds.
4. The FRU mechanical-design-per-incident-time (derived from either the "actual time" question or the summation of the "mechanical timing" question scores) is compared to the "Mechanical design time" Tier 1 and Tier 2 thresholds.
5. A FRU cannot be a CRU if any of its CRU showstopper questions has a negative answer.
6. A FRU cannot be a CRU if any of its prerequisite removals is not a CRU.

CRUability Criteria

The following are the current showstopper questions:

| Showstopper label | Question ID |
| --- | --- |
| Excessive maneuvering required | Excessive Removal Steps |
| No remote PD | Help Center |

CRU Threshold Table

The CRU Threshold Table is maintained by the SAT administrator in the SAT Author view.

| | Tier 1 | Tier 2 |
| --- | --- | --- |
| Number of captured screws | 4 | 8 |
| Number of captured thumbscrews | 4 | 8 |
| Number of cables not visible | 0 | 0 |
| Number of possible incorrect cable connections | 0 | 0 |
| Number of latches/levers | 4 | 8 |
| Number of non-captured fasteners/screws | 0 | 6 |
| Number of cables non-accessible | 0 | 0 |
| Number of quarterturns/pop rivets | 1 | 2 |
| Number of cables | 2 | 8 |
| Number of connections and tools | 10 | 20 |
| Number of different connection and tool types | 4 | 7 |
| Mechanical Timing (minutes) | 5 | 15 |

FRU Scales and Question Subcategories

The following table shows which FRU question subcategories contribute to the Remove and Replace, Problem Determination, Microcode Update, and Total scales. Notice that each question subcategory contributes to only one of the first three scales, plus the Total scale. Thus, the first three scales (Remove and Replace, Problem Determination, Microcode Update) are a "partition" of the Total scale. A plus (+) sign in a table cell indicates that the question timings are added to the accumulated time for the scale and a minus (−) sign indicates that the question timings are subtracted from the accumulated time for the scale.

| | | Scale | | | |
| --- | --- | --- | --- | --- | --- |
| Question Category | Question Subcategory | Remove and Replace | Problem Determination | Microcode Update | Total |
| Product | System Diagnostic | | + | | + |
| | System Call Home | | − | | − |
| | System Remote Support | | − | | − |
| | System Autonomic | | − | | − |
| | PD Information Delivery | | + | | + |
| | Component Information Delivery | + | | | + |
| Remove and Replace | Service Access | + | | | + |
| | Mechanical Timing | + | | | + |
| | Intuitiveness | + | | | + |
| | Component Replacement Instruction | + | | | + |
| | FRU Microcode | | | + | + |
| Problem Determination | Component Diagnostic | | + | | + |
| | Component Call Home | | − | | − |
| | Component Remote Support | | − | | − |
| | Component Autonomic | | − | | − |
| | PD Instruction | | + | | + |

The following table shows which question subcategories contribute to six additional FRU scales that overlap the scales in the above table.

|                          |                     | Scale      |                   |           |                         |                   |
| ------------------------ | ------------------- | ---------- | ----------------- | --------- | ----------------------- | ----------------- |
| Question Subcategory     | Mechanical Design   | Diagnostic | Remote Support    | Autonomic | Component Information   | PD Information    |
| System Diagnostic        |                     | +          |                   |           |                         |                   |
| System Call Home         |                     |            |                   | +         |                         |                   |
| System Remote Support    |                     |            | +                 |           |                         |                   |
| System Autonomic         |                     |            |                   | +         |                         |                   |
| PD Information Delivery  |                     |            |                   |           |                         | +                 |
| Component Information Delivery |               |            |                   |           | +                       |                   |
| Service Access           |                     |            |                   |           |                         |                   |
| Mechanical Timing        | +                   |            |                   |           |                         |                   |
| Intuitiveness            |                     |            |                   |           |                         |                   |
| Component Replacement Instruction |            |            |                   |           | +                       |                   |
| FRU Microcode            |                     |            |                   |           |                         |                   |
| Component Diagnostic     |                     | +          |                   |           |                         |                   |
| Component Call Home      |                     |            |                   | +         |                         |                   |
| Component Remote Support |                     |            | +                 |           |                         |                   |
| Component Autonomic      |                     |            |                   | +         |                         |                   |
| PD Instruction           |                     |            |                   |           |                         | +                 |

System Microcode Scales and Question Subcategories

The following table shows which System Microcode question subcategories contribute to the Microcode Update, Problem Determination, and Total scales. Notice that each question subcategory contributes to only one of the first two scales (Microcode Update, Problem Determination), plus the Total scale. Thus, the first two scales are a "partition" of the Total scale. A plus (+) sign indicates that the question timings are added to the accumulated time for the scale and a minus (−) sign indicates that the question timings are subtracted from the accumulated time for the scale.

|                  |                             | Scale             |                       |       |
| ---------------- | --------------------------- | ----------------- | --------------------- | ----- |
| Question Category | Question Subcategory        | Microcode Update  | Problem Determination | Total |
| Product          | System Diagnostic           |                   | +                     | +     |
|                  | System Call Home            |                   | −                     | −     |
|                  | System Remote Support       |                   | −                     | −     |
|                  | System Autonomic            |                   | −                     | −     |
|                  | PD Information Delivery     |                   | +                     | +     |
|                  | Component Information Delivery | +              |                       | +     |
| Microcode Update | Code Load                   | +                 |                       | +     |
|                  | Code Load Instruction       | +                 |                       | +     |
| Problem Determination | Component Diagnostic   |                   | +                     | +     |
|                  | Component Call Home         |                   | −                     | −     |
|                  | Component Remote Support    |                   | −                     | −     |
|                  | Component Autonomic         |                   | −                     | −     |
|                  | PD Instruction              |                   | +                     | +     |

The following table shows which question subcategories contribute to five additional System Microcode scales that overlap the scales in the above table.

|                             |            | Scale          |           |                       |                |
| --------------------------- | ---------- | -------------- | --------- | --------------------- | -------------- |
| Question Subcategory        | Diagnostic | Remote Support | Autonomic | Microcode Information | PD Information |
| System Diagnostic           | +          |                |           |                       |                |
| System Call Home            |            |                | +         |                       |                |
| System Remote Support       |            | +              |           |                       |                |
| System Autonomic            |            |                | +         |                       |                |
| PD Information Delivery     |            |                |           |                       | +              |
| Component Information Delivery |         |                |           | +                     |                |
| Code Load                   |            |                |           |                       |                |
| Code Load Instruction       |            |                |           | +                     |                |

-continued

| Question Subcategory | Scale | | | | |
|---|---|---|---|---|---|
| | Diagnostic | Remote Support | Autonomic | Microcode Information | PD Information |
| Component Diagnostic | + | | | | |
| Component Call Home | | | + | | |
| Component Remote Support | | + | | | |
| Component Autonomic | | | + | | |
| PD Instruction | | | | | + |

Hardware Installation Scales and Question Subcategories

SAT uses a set of three scales for quantifying and scoring hardware installation times. The following table shows which question subcategories contribute to the Hardware Installation scales. A plus (+) sign indicates that the question timings are added to the accumulated time for the scale.

| Question Category | Question Subcategory | Scale | | |
|---|---|---|---|---|
| | | Hardware Installation Safety | Hardware Installation Installation | Hardware Installation Information |
| Product | Hardware Installation Safety | + | | |
| | Hardware Installation Installation | | + | |
| | Hardware Installation Information | | | + |

Global Calibration Constants and Associated Subcategories

FRU Calibration Constants and Associated Question Subcategories

Each FRU global calibration constant is associated with one or two question subcategories as specified by the following table:

| Calibration Constant | Question Subcategory(s) |
|---|---|
| Mechanical Timing CC | Mechanical Timing |
| Intuitiveness CC | Intuitiveness |
| Component Information CC | Component Information Delivery Component Replacement Instruction |
| Service Access CC | Service Access |
| FRU Microcode CC | FRU Microcode |
| Diagnostic CC | System Diagnostic Component Diagnostic |
| Autonomic CC | System Autonomic Component Autonomic |
| Call Home CC | System Call Home Component Call Home |
| Remote Support CC | System Remote Support Component Remote Support |
| PD Information CC | PD Information Delivery PD Instruction |

System Microcode Calibration Constants (CC) and Associated Question Subcategories Each global system microcode calibration constant is associated with one or two question subcategories as specified by the following table:

| Calibration Constant | Question Subcategory(s) |
|---|---|
| Code Load CC | Code Load |
| Component Information CC | Component Information Delivery Code Load Instruction |
| Diagnostic CC | System Diagnostic Component Diagnostic |
| Autonomic CC | System Autonomic Component Autonomic |
| Call Home CC | System Call Home Component Call Home |
| Remote Support CC | System Remote Support Component Remote Support |
| PD Information CC | PD Information Delivery PD Instruction |

Hardware Installation Calibration Constants and Associated Question Subcategories Each global hardware installation calibration constant is associated with one question subcategory as specified by the following table:

| Calibration Constant | Question Subcategory |
|---|---|
| Hardware Installation Safety CC | Hardware Installation Safety |
| Hardware Installation Installation CC | Hardware Installation Installation |
| Hardware Installation Information CC | Hardware Installation Information |

Internal Calibration Constants

Internal calibration constants are derived from the "external" calibration constants set by the SAT administrator in the Author and Brand views. The internal calibration constants are used in "normalizing functions" for computing a score for a metric. The normalizing functions are linear over a part of their range. Between a score of 25 and 100, each function generates a score that is inversely proportional to a metric. Since the external calibration constant can be interpreted as the value of the metric that maps to a score of 90, then multiplying the external calibration constant by 7.5 to create an internal calibration constant means that the internal calibration constant can be interpreted as the value that maps the metric to a score of 25.

Many of the internal calibration constants are associated with a scale for scoring "repair" per-incident-times (PITs). In the equations defining these calibration constants, an external calibration constant (CC) associated with a question subcategory(s) is transformed into an internal calibration constant by multiplying the external constant (or a sum of external constants) by 7.5.

Most of the external calibration constants used in the following equations defining internal PIT calibration constants are global brand calibration constants.

The formulas for a few of the internal calibration constants use one of the following two product variables, computed from product data.

> Fraction of FRUs With Microcode=(sum over FRUs with Microcode: {(FRU Replacement Rate)×(FRU Quantity)})/(sum over all FRUs: {(FRU Replacement Rate)×(FRU Quantity)})

> Product Average Failures Before Service=sum over all FRUs: {(FRU Failures Before Service)×(FRU Weighting Fraction)}
>
> where FRU Weighting Fraction=(FRU Replacement Rate)×(FRU Quantity)/(sum over all FRUs: {(FRU Replacement Rate)×(FRU Quantity)})

"Sqrt( )" in the following equations denotes the square root function.

Individual FRU Per-Incident-Time Calibration Constants

> FRU Mechanical Design PIT CC=(FRU Mechanical Timing CC)×7.5
>
> FRU Remove and Replace PIT CC=((FRU Mechanical Timing CC)+(FRU Intuitiveness CC)+(FRU Component Information CC)+(FRU Service Access CC))×7.5
>
> FRU Microcode Update PIT CC=(FRU Microcode CC)×7.5
>
> FRU Service Access PIT CC=(FRU Service Access CC)×7.5
>
> FRU Component Information PIT CC=(FRU Component Information CC)×7.5
>
> FRU Problem Determination PIT CC=((FRU Diagnostic CC)+(FRU PD Information CC)−(FRU Autonomic CC)−(FRU Call Home CC)−(FRU Remote Support CC))×7.5
>
> FRU Autonomic PIT CC=((FRU Autonomic CC)+(FRU Call Home CC))×7.5
>
> FRU Remote Support PIT CC=(FRU Remote Support CC)×7.5
>
> FRU Diagnostic PIT CC=(FRU Diagnostic CC)×7.5
>
> FRU PD Information PIT CC=(FRU PD Information CC)×7.5

If FRU has microcode,

> FRU Total PIT CC=(FRU Remove and Replace PIT CC)+(FRU Microcode Update PIT CC)+(FRU Problem Determination PIT CC)

else

> FRU Total PIT CC=(FRU Remove and Replace PIT CC)+(FRU Problem Determination PIT CC)

FRU Total Repair Time Per Machine Month Calibration Constant

> FRU Total Repair Time Per MM CC=Sqrt((FRU Total PIT CC)×(FRU Replacement Rate CC))

Product FRU Per-Incident-Time Calibration Constants

Product FRU (average) PIT calibration constants are the same as individual FRU PIT calibration constants, except for the following two:

> Product FRU Microcode Update CC=(Fraction of FRUs With Microcode)×(FRU Microcode Update CC)
>
> Product FRU Total PIT CC=(FRU Remove and Replace PIT CC)+(FRU Problem Determination PIT CC)+((FRU Microcode Update PIT CC)×(Fraction of FRUs With Microcode))

Product FRU Total Repair Time Per Machine Month Calibration Constant

"FRU Replacement Rate Per MM CC" is a brand calibration constant used in this calculation.

> Product FRU Total Repair Time Per MM CC=Sqrt((Product FRU Total PIT CC)×(FRU Replacement Rate Per MM CC))

Product CE Travel Calibration Constant

> Product CE Travel Time CC=(Brand CE Travel Time)×(7.5/3)/(Product Average Failures Before Service)

Product Customer Interaction Time Calibration Constant

> Product Customer Interaction Time CC=(Brand Customer Interaction Time)×(7.5/3)/(Product Average Failures Before Service)

Product FRU CRU-Adjusted Total Repair Time Per MM Calibration Constant

The following brand parameters and are used below in computing the "Product FRU CRU-Adjusted Total Time Per MM Calibration Constant":

Brand Calibration Constants
FRU Replacement Rate Per MM CC
Tier 1 CRU Content Percent CC
Tier 1 CRU Acceptance Percent CC
Tier 2 CRU Content Percent CC
Tier 2 CRU Acceptance Percent CC
Brand Parameters
CE Travel Time
Customer Interaction Time Also used are the following calibration constants and a product variable defined above:

Calibration Constants
Product FRU Total PIT CC
FRU Problem Determination PIT CC
Product FRU Microcode Update CC
Product Variable
Product Average Failures Before Service Using these calibration constants, brand parameters, and the product variable, "Product FRU CRU-Adjusted Total Repair Time Per MM CC" can be computed as follows:

> CRU Contact Fraction=((Tier 1 CRU Content Percent CC)×(Tier 1 CRU Acceptance Percent CC)×0.0001)+((Tier 2 CRU Content Percent CC)×(Tier 2 CRU Acceptance Percent CC)×0.0001)

Non-CRU Content Fraction=(1−(CRU Content Fraction))

Non-CRU Product FRU Total PIT CC=(Product FRU Total PIT CC)+(Product CE Travel Time CC)+(Product Customer Interaction Time CC)

FRU CRU-Adjusted Total PIT CC=(FRU Problem Determination PIT CC)+(Product FRU Microcode Update CC)+((Non-CRU Product FRU Total PIT CC)×(Non-CRU Content Fraction))

Product FRU CRU-Adjusted Total Repair Time Per MM CC=Sqrt((FRU CRU-Adjusted Total PIT CC)×(FRU Replacement Rate Per CC))

SM Per-Incident-Time Calibration Constants

SM Microcode Update PIT CC=((SM Code Load CC)+(SM Component Information CC))×7.5

SM Problem Determination PIT CC=((SM Diagnostic CC)+(SM PD Information CC)−(SM Autonomic CC)−(SM Remote Support CC))×7.5

SM Component Information PIT CC=(SM Component Information CC)×7.5

SM PD Information PIT CC=(SM PD Information CC)×7.5

SM Autonomic PIT CC=((SM Autonomic CC)+(SM Remote Support CC))×7.5

SM Remote Support PIT CC=(SM Remote Support CC)×7.5

SM Diagnostic PIT CC=(SM Diagnostic CC)×7.5

SM Total PIT CC=(SM Microcode Update PIT CC)+(SM Problem Determination CC)

Product SM Per-Incident-Time Calibration Constants

Product SM (average) PIT calibration constants are the same as individual SM PIT calibration constants.

Product SM Total Time Per Machine Month Calibration Constant

Product SM Total Time Per MM CC=Sqrt((SM Total PIT CC)×(SM Replacement Rate Per MM CC))

Individual FRU Repair-Time Metrics

Individual FRU repair-time metrics are either per-incident-times (PITs) or repair times per machine month (MM). Most of the metrics defined are PITs. The last metric in the list measures total repair time Per MM.

Removal Path Definitions

The total removal path for a FRU includes the FRU and all its prerequisite removals.

The prerequisite removal path for a FRU includes only its prerequisite removals.

If a FRU in removal path has a quantity n, which can be greater than one, both definitions of removal path include all n FRUs unless otherwise specified.

FRU Mechanical Design PIT

Component Mechanical Timing=sum of component's (FRU, part, or subassembly) mechanical timing questions, or value of "actual time" question, whichever is larger FRU Mechanical Design PIT=(Component Mechanical Timing)+(sum of Component Mechanical Timing for all components in the FRU's prerequisite removal path)/(FRU Failures Before Service)

FRU Service Access PIT

Shutdown Time = Brand Complete Machine Shutdown Time $= \begin{pmatrix} \text{if at least one } FRU \text{ in removal path} \\ \text{requires a complete shutdown} \end{pmatrix}$ = Brand Partial Machine Shutdown Time $\begin{pmatrix} \text{if no } FRU \text{ in removal path requires} \\ \text{a complete shutdown but at least one} \\ FRU \text{ in removal path requires a} \\ \text{partial shutdown} \end{pmatrix}$ $= \begin{Bmatrix} \text{number of } FRUs \\ \text{in total} \\ \text{removal path} \\ \text{that require} \\ \text{a shutdown} \end{Bmatrix} \times \begin{pmatrix} \text{Brand } FRU \\ \text{Shutdown Time} \end{pmatrix}$ $\begin{pmatrix} \text{if no } FRU \text{ in removal path} \\ \text{requires a complete or partial shutdown} \end{pmatrix}$ FRU Service Access PIT=((Shutdown Time)+(sum of FRU's Service Access question values in the total removal path))/(FRU Failures Before Service)

FRU Intuitiveness PIT

FRU Intuitiveness PIT=(sum of FRU's Intuitiveness question values for all components in the total removal path excluding quantities)/(FRU Failures Before Service)

FRU Component Information PIT

FRU Component Information PIT=(sum of Component Information Delivery and Component Replacement Instruction question values)×(Component Information Multiplier)/(FRU Failures Before Service)

FRU Remove and Replace PIT

FRU Mechanical Design PIT=FRU Service Access PIT+FRU Mechanical Design PIT+FRU Component Information PIT+FRU Intuitiveness PIT

FRU Diagnostic PIT

FRU Diagnostic PIT=sum of System Diagnostic and Component Diagnostic question values

FRU Autonomic PIT

FRU Maximum System Call Home Time=maximum possible sum of FRU System Call Home question values If the answer to the call home special question=yes FRU System Call Home Time=(sum of System Call Home question timing values)

Else

FRU System Call Home Time=(FRU Maximum System Call Home Time)

FRU Autonomic PIT=(sum of FRU System Autonomic, Component Autonomic, and Component Call Home question timing values)+(FRU System Call Home Time)

FRU Remote Support PIT

Maximum System Remote Support Time=maximum possible sum of FRU System Remote Support question values If the answer to the download fixes remote support question=yes Download Fixes Time=0.5×(sum of System Remote Support question timing values)

Else

Download Fixes Time=0.5×(Maximum System Remote Support Time)

If the answer to the interrogate product remote support question=yes

Interrogate FRU Time=0.5×(sum of System Remote Support question timing values)

Else

Interrogate FRU Time=0.5×(Maximum System Remote Support Time)

FRU Remote Support Per-Incident-Time=(sum of Component Remote Support question timing values)+(Interrogate FRU Time)+(Download Fixes Time)

FRU PD Information PIT

FRU PD Information PIT=(sum of PD Information Delivery and PD Instruction question values)×(PD Information Multiplier)

FRU Problem Determination PIT

FRU Problem Determination PIT=(FRU Diagnostic PIT)+(FRU PD Information PIT)−(FRU Autonomic PIT)−(FRU Remote Support PIT)

FRU Microcode Update PIT

FRU Microcode Update PIT=sum of FRU Microcode question values

FRU Total PIT

FRU Total PIT=(FRU Remove and Replace PIT)+(FRU Problem Determination PIT)+(FRU Microcode Update PIT)

FRU Total Repair Time Per MM

FRU Total Repair Time Per MM=(FRU Total PIT)×(FRU Replacement Rate Per MM)

FRU CRU-Adjusted Total Repair Time Per MM

The computation of the "FRU CRU-Adjusted Total Repair Time Per MM" requires W1 and X1 in the following Service Channel Distribution Fractions table:

| Service Channel | Tier 1 CRU Distribution Fractions | Tier 2 CRU Distribution Fractions | Non-CRU Distribution Fractions | All FRUs (also No Parts) |
|---|---|---|---|---|
| Customer | W1 | X1 | Y1 | Z1 |
| Dealer Onsite | W2 | X2 | Y2 | Z2 |
| CE Onsite | W3 | X3 | Y3 | Z3 |
| Depot Service | W4 | X4 | Y4 | Z4 |

Tier 1 CRU Acceptance Fraction = W1
Tier 2 CRU Acceptance Fraction = X1

Extra PIT=((Brand CE Travel Time)+(Brand Customer Interaction Time))/(FRU Failures Before Service)

If FRU is a Tier 1 CRU,

Tier 1 CRU Non-acceptance Fraction=1−(Tier 1 CRU Acceptance Fraction)

Extra PIT=((Brand CE Travel Time)+(Brand Customer Interaction Time))/(FRU Failures Before Service)

FRU CRU-Adjusted Total PIT=((FRU Total PIT)+(Extra PIT))×(Tier 1 CRU Non-acceptance Fraction))+((FRU Problem Determination PIT)×(Tier 1 CRU Acceptance Fraction))

Else if FRU is a Tier 2 CRU,

Tier 2 CRU Non-acceptance Fraction=1−(Tier 2 CRU Acceptance Fraction)

FRU CRU-Adjusted Total PIT=((FRU Total PIT)+(Extra PIT))×(Tier 2 CRU Non-acceptance Fraction))+((FRU Problem Determination PIT)×(Tier 2 CRU Acceptance Fraction))

Else

FRU CRU-Adjusted Total PIT=(FRU Total PIT)+(Extra PIT)

FRU CRU-Adjusted Total Repair Time Per MM=(FRU CRU-Adjusted Total PIT)×(FRU Replacement Rate Per MM)

Individual System Microcode Component Metrics

Individual FRU repair-time metrics are either per-incident-times (PIT) or repair times per machine month (MM). Most of the metrics defined in this section are PITs. The last metric in the list measures total repair time per MM.

SM Component Information PIT

SM Component Information PIT=(sum of Component Information Delivery and Code Load Instruction question values)×(Microcode Information Multiplier)

SM Microcode Update PIT

SM Microcode Update Timing=sum of SM's Code Load questions, or value of "microcode actual time" question, whichever is larger SM Microcode Update PIT=(SM Microcode Update Timing)+(SM Component Information PIT)

SM Diagnostic PIT

SM Diagnostic PIT=sum of System Diagnostic and Component Diagnostic question values SM Autonomic PIT Maximum System Call Home Time=maximum possible sum of SM System Call Home question values If the answer to the call home special question=yes System Call Home Time Savings=(Maximum System Call Home Time)−(sum of System SM Call Home question timing values)

Else

System Call Home Time Savings=(Maximum System Call Home Time)SM Autonomic PIT=sum of SM System Autonomic, Component Autonomic, Component Call Home question timing values, plus (System Call Home Time Savings)

SM Remote Support PIT

Maximum System Remote Support Time=maximum possible sum of SM System Remote Support question values If the answer to the download fixes remote support question=yes Download Fixes Time Savings=0.5×((Maximum System Remote Support Time)−(sum of System SM Remote Support question timing values)

Else

Download Fixes Time Savings=0.5×(Maximum System Remote Support Time)

If the answer to the interrogate product remote support question=yes

Interrogate SM Time Savings=0.5×((Maximum System Remote Support Time)−(sum of System SM Remote Support question timing values)

Else

Interrogate SM Time Savings=0.5×(Maximum System Remote Support Time)SM Remote Support Per-Incident-Time=sum of Component Remote Support question timing values, plus (Interrogate SM Time Savings)

SM PD Information PIT

SM PD Information PIT=(sum of PD Information Delivery and PD Instruction question values)×(PD Information Multiplier)

SM Problem Determination PIT

SM Problem Determination PIT=(SM Diagnostic PIT)+(SM PD Information PIT)−(SM Autonomic PIT)−(SM Remote Support PIT)

SM Total PIT

SM Total PIT=(SM Microcode Update PIT)+(SM Problem Determination PIT)

SM Total Repair Time Per MM

SM Total Repair Time Per MM=(SM Total PIT)×(SM Replacement Rate Per MM)

Product FRU and System Microcode Metrics

Product FRU and System Microcode Per-Incident-Times

Product FRU Per-Incident-Times and Product System Microcode Component (SMC) Per-Incident-Times are computed as weighted averages of the individual FRU or SMC per-incident times (see Appendices J and K for the equations for computing individual component per-incident-times).

In the following equations for computing product weighted-average per-incident-times, "component" denotes a FRU or SMC. "Component Per-Incident-Time" denotes one of the component per-incident-times. "All components" denotes either all FRUs or all SMCs, Total Product Replacement Rate=sum over all components: {(Component Quantity)×(Component Replacement Rate Per MM)}

Component Weighting Fraction=(Component Quantity)×(Component Replacement Rate Per MM)/(Total Product Replacement Rate)

Product Average Per-Incident-Time=sum over All Components: {(Component Per-Incident-Time)×(Component Weighting Fraction)}

Product FRU Average Total Repair Time Per MM

"Product FRU Average Total Repair Time Per MM" is computed as weighted averages of the individual FRU Total Repair Times Per MM.

FRU Weighting Fraction=(FRU Quantity)/(sum over all FRUs: (FRU Quantity))

Product FRU Average Total Repair Time Per MM=sum over all FRUs: {(FRU Total Repair Time Per MM)×(FRU Weighting Fraction)}

Product System Microcode Average Total Repair Time Per MM

"Product SMC Average Total Repair Time Per MM" is computed as weighted averages of the individual SMC Total Repair Times Per MM (see Appendices K).

SMC Weighting Fraction=(SMC Quantity)/sum over all components: (SMC Quantity)

Product SM Average Total Repair Time Per MM=sum over all SMCs: {(SMC Total Repair Time Per MM)×(SCM Weighting Fraction)}

Product FRU CRU-Adjusted Average Total Repair Time Per MM

Product FRU CRU-Adjusted Average Total Repair Time per MM is computed as a weighted average of the individual FRU CRU-Adjusted Total Repair Times Per MM (see Appendices J).

FRU Weighting Fraction=(FRU Quantity)/(sum over all components: {(FRU Quantity)})

Product FRU CRU-Adjusted Average Total Repair Time Per MM=sum over all FRUs: {(FRU CRU-Adjusted Total Repair Time Per MM)×(FRU Weighting Fraction)}

FRU Information Multipliers

The question timing totals used in computing FRU Component Information PIT and FRU PD Information PIT are adjusted by multiplying them by a fraction between 0 and 1, which is determined from the answers to "special" questions about how frequently the service provider must access information required to repair a FRU.

Component Information Multiplier

For each FRU, the value of the Component Information Multiplier is determined from the answers to the "FRU Instructions" question and the "SI Info Needed" question according to the following table:

| "FRU Instructions" Question Answer | "SI Info Needed" Question Answer | Component Information Multiplier |
|---|---|---|
| No | — | 0.0 |
| Yes | Choice 1 | 0.25 |
| Yes | Choice 2 | 0.50 |
| Yes | Choice 3 | 1.00 |
| Yes | (not answered) | 1.00 |

PD Information Multiplier

For each FRU, the value of the PD Information Multiplier is determined from the answers to the "Have PD Documentation" question and the "UM Info Needed" question according to the following table:

| "Have PD Documentation" Question Answer | "UM Info Needed" Question Answer | PD Information Multiplier |
|---|---|---|
| No | — | 0.0 |
| Yes | Choice 1 | 0.25 |
| Yes | Choice 2 | 0.50 |
| Yes | Choice 3 | 1.00 |
| Yes | (not answered) | 1.00 |

System Microcode Information Multipliers

The question timing totals used in computing SM Component Information PIT and SM PD Information PIT are adjusted by multiplying them by a fraction between 0 and 1, which is determined from the answers to "special" questions about how frequently the service provider must access information required to repair the system microcode component.

Component Information Multiplier

For each system microcode component, the value of the Component Information Multiplier is determined from the answers to the "Have Microcode Instructions" question and the "Micro Info Needed" question according to the following table:

| "Have Micro Instructions" Question Answer | "Micro Info Needed" Question Answer | Microcode Information Multiplier |
|---|---|---|
| No | — | 0.0 |
| Yes | Choice 1 | 0.25 |
| Yes | Choice 2 | 0.50 |
| Yes | Choice 3 | 1.00 |
| Yes | (not answered) | 1.00 |

PD Information Multiplier

For each system microcode component, the value of the PD Information Multiplier is determined from the answers to the "Have PD Documentation" question and the "UM Info Needed" question according to the following table:

| "Have PD Documentation" Question Answer | "UM Info Needed" Question Answer | PD Information Multiplier |
|---|---|---|
| No | — | 0.0 |
| Yes | Choice 1 | 0.25 |
| Yes | Choice 2 | 0.50 |
| Yes | Choice 3 | 1.00 |
| Yes | (not answered) | 1.00 |

Special Questions

Special questions are used model activities that do not fit the generic SAT model. Since custom Java code is required to handle special questions, special questions have been kept to a minimum.

Information Special Questions

| Question Short Name | Question Category | Question Subcategory | Question Type | Purpose |
|---|---|---|---|---|
| FRU Instructions | Component Remove and Replace | Component Replacement Instructions | Yes/No | To ask if instructions required to replace FRU |
| SI Info Needed | Component Remove and Replace | Component Replacement Instructions | Multiple Choice | To ask how often users must review the info |
| Have Micro Instructions | Microcode Update | Code Load Instructions | Yes/No | To ask if instructions required to replace system microcode |
| Micro Info Needed | Microcode Update | Code Load Instructions | Multiple Choice | To ask how often users must review the info |
| Have PD Instructions | Problem Determination | Component Diagnostic | Yes/No | To ask if instructions required perform PD |
| UM Info Needed | Problem Determination | Component Diagnostic | Multiple Choice | To ask how often users must review the info |

Actual Time Special Questions

| Question Short Name | Question Category | Question Subcategory | Question Type | Purpose |
|---|---|---|---|---|
| Actual Time | Component Remove and Replace | Mechanical Timing | Yes/No | To ask if actual mechanical timing should replace computed value |
| Use This Time | Component Remove and Replace | Mechanical Timing | Decimal | To input actual mechanical timing |
| Microcode Actual Time | Microcode Update | Code Load | Yes/No | To ask if actual microcode load time should replace computed value |
| Microcode Use This Tijme | Microcode Update | Code Load | Decimal | To input actual microcode load time |
| PD Actual Time | Problem Determination | Component Diagnostic | Yes/No | To ask if actual PD time should replace computed value |
| PD Use This Time | Problem Determination | Component Diagnostic | Decimal | To input actual PD time |

Call Home and Remote Support Special Questions

| Question Short Name | Question Category | Question Subcategory | Question Type | Purpose |
|---|---|---|---|---|
| Fault Isolation Send Alert | Problem Determination | Component Diagnostic | Yes/No | To ask if component has call home capability |
| Interrogate Product Alert | Problem Determination | Component Diagnostic | Yes/No | To ask if Remote Support can interrogate component |
| Interrogate Product No Alert | Problem Determination | Component Diagnostic | Yes/No | To ask if Remote Support can interrogate component |
| Download FRU Fixes Alert | Problem Determination | Component Diagnostic | Yes/No | To ask if Remote Support can download FRU fixes |
| Download FRU Fixes No Alert | Problem Determination | Component Diagnostic | Yes/No | To ask if Remote Support can download FRU fixes |

Miscellaneous Special Questions

| Question Short Name | Question Category | Question Subcategory | Question Type | Purpose |
|---|---|---|---|---|
| Hardware Installation (HWI) | Product | Hardware Installation Installation | Yes/No | To indicate whether HWI is being evaluated |
| Service Access Time Choice | Component Remove and Replace | Mechanical Timing | Multiple Choice | To indicate appropriate brand shutdown time |
| Tools | Component Remove and Replace | Mechanical Timing | Integer | To Exclude prerequisite components' tools count from CRU statistics |

Hardware Installation Calibration Constants and Metrics

HWI Calibration Constants

HWI Safety PIT CC=(HWI Safety CC)×7.5

HWI Installation PIT CC=(HWI Installation CC)×7.5

HWI Information PIT CC=(HWI Information CC)× 7.5

HWI Safety PIT

FRU HWI Safety PIT=sum of Hardware Installation Safety question values

FRU HWI Installation PIT

FRU HWI Installation PIT=sum of Hardware Installation Installation question values FRU HWI Information PIT FRU HWI Information PIT=sum of Hardware Installation Information question values FRU and System Microcode Scoring SAT scores are generated using a "normalizing" function that transforms a metric, such as a repair time, into a score in the range 0-100. A normalizing function N has a single variable (the metric), and a single parameter (the calibration constant), that characterizes the particular normalizing function.

Score=$N$(metric, calibration constant)

In the following tables, each row contains a score in the first column, a variable (the metric) in the second column, and a parameter (the calibration constant) in the third column. Thus, the second and third columns specify the information required to generate the score in the first column via the appropriate normalizing function.

FRU Scoring Tables

Individual FRU Per-Incident-Time (PIT) Scoring

| Individual FRU PIT Score | Individual FRU Per-Incident-Time | Calibration Constant |
|---|---|---|
| Remove and Replace | FRU Remove and Replace PIT | FRU Remove and Replace PIT CC |
| Mechanical Design | FRU Mechanical Design PIT | FRU Mechanical Design PIT CC |
| Component Information | FRU Component Information PIT | FRU Component Information PIT CC |
| Microcode Update | FRU Microcode Update PIT | FRU Microcode Update PIT CC |
| Problem Determination | FRU Problem Determination PIT | FRU Problem Determination PIT CC |
| Diagnostic | FRU Diagnostic PIT | FRU Diagnostic PIT CC |
| PD Information | FRU PD Information PIT | FRU PD Information PIT CC |
| Autonomic | FRU Autonomic PIT | FRU Autonomic PIT CC |
| Remote Support | FRU Remote Support PIT | FRU Remote Support PIT CC |
| Total | FRU Total PIT | FRU Total PIT CC |

Additional Individual FRU Scoring

| Individual FRU Score | Metric | Calibration Constant |
|---|---|---|
| Total Repair Time Per MM | FRU Total Repair Time Per MM | FRU Total Repair Time Per MM CC |

Product FRU Per-Incident-Time (PIT) Scoring

| Product FRU PIT Score | Product FRU Average Per-Incident-Time | Calibration Constant |
|---|---|---|
| Remove and Replace | FRU Remove and Replace Average PIT | FRU Remove and Replace PIT CC |
| Mechanical Design | FRU Mechanical Design Average PIT | FRU Mechanical Design PIT CC |
| Component Information | FRU Component Information Average PIT | FRU Component Information CC |
| Microcode Update | FRU Microcode Update Average PIT | Product FRU Microcode Update PIT CC |
| Problem Determination | FRU Problem Determination Average PIT | FRU Problem Determination PIT CC |
| Diagnostic | FRU Diagnostic Average PIT | FRU Diagnostic PIT CC |
| PD Information | FRU PD Information Average PIT | FRU PD Information PIT CC |
| Autonomic | FRU Autonomic Average PIT | FRU Autonomic PIT CC |
| Remote Support | FRU Remote Support Average PIT | FRU Remote Support PIT CC |

-continued

| Product FRU PIT Score | Product FRU Average Per-Incident-Time | Calibration Constant |
|---|---|---|
| Total | FRU Total Average PIT | Product FRU Total PIT CC |

Additional Product FRU Scoring

| Product FRU Score | Metric | Calibration Constant |
|---|---|---|
| Total Repair Time Per MM | Sqrt(Product FRU Average Total Repair Time Per MM) | Product FRU Total Repair Time Per MM CC |
| CRU-Adjusted Total Repair Time Per MM | Sqrt(Product FRU CRU-Adjusted Average Total Repair Time Per MM) | Product FRU CRU-Adjusted Total Repair Time Per MM CC |

System Microcode Scoring Tables

Individual SM Per-Incident-Time (PIT) Scoring

| Individual SM PIT Score | Individual SMC Per-Incident-Time | Calibration Constant |
|---|---|---|
| Microcode Update | SM Microcode Update PIT | SM Microcode Update PIT CC |
| Component Information | SM Component Information PIT | SM Component Information PIT CC |
| Problem Determination | SM Problem Determination PIT | SM Problem Determination PIT CC |
| Diagnostic | SM Diagnostic PIT | SM Diagnostic PIT CC |
| PD Information | SM PD Information PIT | SM PD Information PIT CC |
| Autonomic | SM Autonomic PIT | SM Autonomic PIT CC |
| Remote Support | SM Remote Support PIT | SM Remote Support PIT CC |
| Total | SM Total PIT | SM Total PIT CC |

Product SM Per-Incident-Time (PIT) Scoring

| Product SM PIT Score | Product SM Average Per-Incident-Time | Calibration Constant |
|---|---|---|
| Microcode Update | SM Microcode Update Average PIT | SM Microcode Update PIT CC |
| Component Information | SM Component Information Average PIT | SM Component Information PIT CC |
| Problem Determination | SM Problem Determination Average PIT | SM Problem Determination PIT CC |
| Diagnostic | SM Diagnostic Average PIT | SM Diagnostic PIT CC |
| PD Information | SM PD Information Average PIT | SM PD Information PIT CC |
| Autonomic | SM Autonomic Average PIT | SM Autonomic PIT CC |
| Remote Support | SM Remote Support Average PIT | SM Remote Support PIT CC |
| Total | SM Total Average PIT | SM Total PIT CC |

Additional Product SM Scoring

| Product SM Score | Metric | Calibration Constant |
|---|---|---|
| Total Repair Time Per MM | Sqrt(Product SM Average Total Repair Time Per MM) | Product SM Total Repair Time CC |

Family of Normalizing Functions

A SAT normalizing function has a single variable, the metric (m), and a single parameter, the calibration constant (c). The parameter, c, determines the specific normalizing function in the family of normalizing functions. Each normalizing function N(m,c) is defined as follows:

$$N(m, c) = N_1(m, c), \text{ if } m <= c$$
$$\qquad\quad = N_2(m, c), \text{ if } m > c$$

where $$N_1(m, c) = 100 \times (1 - ((3/4) \times (m/c)))$$
$$N_2(m, c) = 50/(1 + (m/c)^6)$$

Each function N(m,c) is monotonically decreasing over its range. Each is linear for the range (0<=m<=c), and each is continuous since $$N_1(c,c) = N_2(c,c) \text{ and } N_2(c,c) = N_2(c,c)$$

CRU Content

CRU Content measures the fraction of repair actions (incidents) that involve a CRU. There are three CRU Content measures, one for Tier 1 CRUs, one for Tier 2 CRUs, and one for total CRUs.

Product FRU Replacement Rate Per MM=sum over all FRUs: {(FRU Replacement Rate Per MM)}

Tier 1 CRU Content Percent=100×(sum over all Tier 1 CRUs; {(FRU Replacement Rate Per MM)})/ (Product FRU Replacement Rate Per MM)

Tier 2 CRU Content Percent=100×(sum over all Tier 2 CRUs; {(FRU Replacement Rate Per MM)})/ (Product FRU Replacement Rate Per MM)

Total CRU Content Percent=100×(sum over all CRUs; {(FRU Replacement Rate Per MM)})/(Product FRU Replacement Rate Per MM)

Service Channel Distribution Fractions Table

The following Service Channel Distribution Fractions Table is required for computing the Projected Service Cost Assessment.

Service Channel Distribution Fractions

| Service Channel | Tier 1 CRU Distribution Fractions | Tier 2 CRU Distribution Fractions | Non-CRU Distribution Fractions | All FRUs (Also No-Parts) |
|---|---|---|---|---|
| Customer | 0.xx | 0.xx | 0.xx | 0.xx |
| Dealer Onsite | 0.xx | 0.xx | 0.xx | 0.xx |
| CE Onsite | 0.xx | 0.xx | 0.xx | 0.xx |
| Depot Service | 0.xx | 0.xx | 0.xx | 0.xx |

The values in this table are computed from the following Service Distribution Percentages which are included in the Brand Parameters:
1. Percent of Service Calls Handled by Dealer (the rest are routed to the manufacturer)—denoted by "Dealer" when converted to fraction
2. Percent of manufacturer Service Calls Routed to Depot Service—denoted by "Depot" when converted to fraction
3. Percent of manufacturer Service Calls Resulting in Customer Replacement—denoted by "Cust" when converted to fraction
4. Percent of Customer Replacements That Are Tier 1 CRUs (the rest are Tier 2 CRUs)—denoted by "T1 cust" when converted to fraction These brand parameters are used to compute the values in the following "preliminary" service channel distribution table:

Preliminary Service Channel Distribution Table

| Service Channel | Tier 1 CRU Distribution Fractions | Tier 2 CRU Distribution Fractions | Non-CRU Distribution Fractions |
|---|---|---|---|
| Customer | C1 | C2 | 0 |
| Dealer Onsite | D1 | D2 | D3 |
| CE Onsite | B1 | B2 | B3 |
| Depot Service | E1 | E2 | E3 |
| Total | T1 | T2 | Non |

In this table, the symbols in the cells are values that can be computed from the above brand distribution parameters. The values in the twelve cells in the first four rows total to 1, and the value in each cell of the Total row is the sum of the above cells in its column. The table is filled out by the following rules:

1. T1 and T2 are obtained from the CRU content computations.
2. Compute the non-CRU fraction $Non = 1 - T1 - T2$ 3. Compute dealer CRU fractions so that dealers have same CRU content fractions as the total for all channels:

$D1 = Dealer \times T1$ $D2 = Dealer \times T2$ $D3 = Dealer \times Non$

4. Everything not a dealer is an manufacturer call.

$manufacturer = 1 - Dealer$

5. Compute customer CRU fractions for manufacturer calls, applying Tier 1 and Tier 2 CRU fractions, but don't use more than the remaining allocation.

$C1 = \min((manufacturer \times Cust \times T1cust), (T1-D1))$ $C2 = \min((manufacturer \times Cust \times (1-T1cust)), (T2-D2))$ 6. Compute remainder CRU fractions after allocating Dealer and Customer channels.

$Rem = 1 - C1 - C2 - D1 - D2 - D3$ $R1 = (T1 - C1 - D1)/Rem$ $R2 = (T2 - C2 - D2)/Rem$ $R3 = (Non - D3)/Rem$

7. Distribute depot according to remainder CRU fractions, but don't use more than remaining allocation.

$E1 = \min((manufacturer \times Depot \times R1), (T1-C1-D1))$ $E2 = \min((manufacturer \times Depot \times R2), (T2-C2-D2))$ $E3 = \min((manufacturer \times Depot \times R3), (Non-D3))$ 8. All that's remaining goes into CE Onsite.

$B1 = T1 - C1 - D1 - E1$ $B2 = T2 - C2 - D2 - E2$ $B3 = Non - D3 - E3$

The values in the Service Channel Distribution Fractions table can now be computed from the values in the Preliminary Distributions table.

Service Channel Distribution Fractions

| Service Channel | Tier 1 CRU Distribution Fractions | Tier 2 CRU Distribution Fractions | Non-CRU Distribution Fractions | All FRUs (also No Parts) |
|---|---|---|---|---|
| Customer | W1 | X1 | Y1 | Z1 |
| Dealer Onsite | W2 | X2 | Y2 | Z2 |
| CE Onsite | W3 | X3 | Y3 | Z3 |
| Depot Service | W4 | X4 | Y4 | Z4 |

The values are computed by the following equations. Note that total of each column in this table is 1.

$W1 = (C1/T1), W2 = (D1/T1), W3 = (B1/T1), W4 = (E1/T1)$ $X1 = (C2/T2), X2 = (D2/T2), X3 = (B2/T2), X4 = (E2/T2)$ $Y1 = 0, Y2 = (D3/Non), Y3 = (B3/Non), Y4 = (E3/Non)$ $Z1 = (C1+C2), Z2 = (D1+D2+D3), Z3 = (B1+B2+B3), Z4 = (E1+E2+E3)$

Duration of Repair Action (DRA)

The FRU Duration of Repair Action (DRA) is the total per-incident repair time plus the customer interaction time, and does not depend upon which service channel is used to service and replace the FRU.

The following information is used to compute individual and product FRU Duration of Repair Action (DRA):
1. Brand Parameter
    Customer Interaction Time (in minutes)
2. FRU Parameters
    FRU Replacement Rate Per MM
    FRU Quantity
    FRU Failures Before Service
3. Variable from the Individual FRU Per-Incident Repair Time Calculations
    FRU Total Per-Incident-Time Individual FRU DRA Individual FDU DRA = (FRU Total Per-Incident-Time) + ((Customer Interaction Time)/(FRU Failures Before Service))

Product Average FRU DRA

The Product Average FRU DRA is computed as a weighted average of the individual FRU DRAs, where both FRU Replacement Rate Per MM and FRU Quantity contribute to the weighting.

FRU Weighting Fraction=((FRU Replacement Rate Per MM)×(FRU Quantity))/(sum over all FRUs: {(FRU Replacement Rate Per MM)×(FRU Quantity))}

Product Average FRU DRA=sum over all FRUs: {(Individual FRU DRA)×(FRU Weighting Fraction)}

Preventive Maintenance

The Preventive Maintenance (PM) Assessment for each product is optional. The PM assessment is performed if the product parameter Enable Preventive Maintenance is selected, in which case the following PM parameters must be entered in the Product Properties dialog:

Projected Product Usage (in POH per month or pages per month)
PM Usage Cycle Driven by (usage or time)

If PM is enabled, multiple PM activities may be defined. A PM activity can include other PM activities, so that if PM X includes PM Y, whenever PM X is performed, PM Y is also performed. For each PM activity, the following data must be entered:

PM Name
PM Usage Count, if usage-driven cycle
    Or PM Time Interval (in months), if time-driven cycle
List of FRUs, Parts, and their quantities in the PM Kit
Cost of Non-FRU Components
Time To Perform PM
Add CE Travel Time (Yes or No)
A List of Other PM activities included in This PM (a list of PM names)

In the PM assessment, the following computations are performed.

PM Time Interval In Months
    If (PM cycle) is "Usage Driven":

PM Time Interval In Months=(PM Usage Count)/(Projected Product Usage Per Month)

Else If (PM Cycle) is "Time Driven":

PM Time Interval In Months=(PM Time Interval)

PM Elapsed Time In Minutes
    If (Add CE Travel Time) is "yes"

PM Elapsed Time In Minutes=(Input PM Time In Minutes)+(Brand CE Travel Time)

Else

PM Elapsed Time In Minutes=(Input PM Time In Minutes)

PM Elapsed Time Per MM

PM Time Per MM=(PM Elapsed Time In Minutes)/(PM Time Interval In Months)

PM FRU Cost Per MM

PM FRU Cost Per MM=(sum over all FRUs in PM: {(FRU Cost)})/(PM Time Interval In Months)

Total PM FRU Cost Per MM

Total PM FRU Cost Per MM=(PM FRU Cost Per MM)+(sum over included PMs: {(PM FRU Cost Per MM)})

PM Non-FRU Cost Per MM

PM Non-FRU Cost Per MM=(PM Non-FRU Cost)/(PM Time Interval In Months)

Total PM Non-FRU Cost Per MM

Total PM Non-FRU Cost Per MM=(PM Non-FRU Cost Per MM)+(sum over included PMs: {(PM Non-FRU Cost Per MM)})

PM FRU Per-Incident Labor Rate

The CE Onsite non-CRU labor rate in the Service Channel Labor Rates table is required to compute PM Cost. The labor rates for service channel='CE Onsite' are either 'per incident' or 'per hour'.

If values in the CE Onsite row are "per incident",

PM FRU Per-Incident Labor Rate=value from table

If values in the CE Onsite row are "per hour",

PM FRU Per-Incident Labor Rate=(value from table)×(PM Elapsed Time in Minutes)/60

PM Labor Cost Per MM

PM FRU Labor Cost Per MM=(PM FRU Per-Incident Labor Rate)/(PM Time Interval In Months)

PM Labor Cost Per MM=(sum over all FRUs in PM: {(PM FRU Labor Cost Per MM)})

Total PM Labor Cost Per MM

Total PM Labor Cost Per MM=(PM Labor Cost Per MM)+(sum over included PMs: {(PM Labor Cost Per MM)})

Projected Service Cost

The Projected Service Cost is computed as a sum of the following costs:
    Parts Cost
    Labor Cost
    Preventive Maintenance Cost
    Microcode Maintenance Cost
    Parts Distribution Cost
    Call Center Cost The following information is used to computing these costs:
    1. FRU Parameters
        FRU Quantity (required to compute Parts Cost, Labor Cost, Parts Distribution Cost, Call Center Cost)
        FRU Replacement Rate Per MM (required to compute Parts Cost, Labor Cost, Parts Distribution Cost, Call Center Cost)
        FRU Cost (required to compute Parts Cost)
    2. Brand Parameters
        Parts Takedown Percentage (required to compute Parts Cost)
        Labor Takedown Percentage (required to compute Labor Cost)
        Call Center Cost Per Minute (required to compute Call Center Cost)
        CE Travel Time (required to compute Labor Cost)
    3. Individual FRU DRA (required to compute Labor Cost)
    4. Product FRU PD Average PIT (required to compute Call Center Cost)

5. Brand Financial Parameters for Service Channel Labor Rates (required to compute Labor Cost, Preventive Maintenance Cost, and Microcode Maintenance Cost)

Service Channel Labor Rates

| Service Channel | Tier 1 CRU Labor Rate | Tier 2 CRU Labor Rate | Non-CRU And No-Part Labor Rate |
|---|---|---|---|
| Customer | xx.x | xx.x | xx.x |
| Dealer Onsite | xx.x | xx.x | xx.x |
| CE Onsite | xx.x | xx.x | xx.x |
| Depot Service | xx.x | xx.x | xx.x |

The labor rates for service channel='CE Onsite' are either 'per incident' or 'per hour'. All other rates in this table are always 'per incident'.

If values in the CE Onsite row are "per incident",

CE Onsite Per-Incident Labor Rate=value from table

If values in the CE Onsite row are "per hour",

CE Onsite Per-Incident Labor Rate=(value from table)×((FRU DRA)+(Brand CE Travel Time)/(FRU Failures Before Service))/60

4. Brand Financial Parameters for Service Channel Parts Distribution Cost Table:

Service Channel Parts Distribution Cost

| Service Channel | Cost Per Repair Action |
|---|---|
| Customer | x.xx |
| Dealer Onsite | x.xx |
| CE Onsite | x.xx |
| Depot Service | x.xx |

5. Product Parameters
   No-Part Rate Per MM (required to compute Labor Cost)
   Microcode Maintenance Cost Parameters (required to compute Microcode Maintenance Cost)
      Number of Maintenance Activities Per Year
      Number of Maintenance Activities Per Year Requiring Travel
      Maintenance Activity Time (in minutes)
6. Service Distribution Channel Fractions table (required to compute Labor Cost)

| Service Channel | Tier 1 CRU Distribution Fractions | Tier 2 CRU Distribution Fractions | Non-CRU Distribution Fractions | All FRUs and No-Part |
|---|---|---|---|---|
| Customer | 0.xx | 0.xx | 0.xx | 0.xx |
| Dealer Onsite | 0.xx | 0.xx | 0.xx | 0.xx |
| CE Onsite | 0.xx | 0.xx | 0.xx | 0.xx |
| Depot Service | 0.xx | 0.xx | 0.xx | 0.xx |

7. Preventive Maintenance variables (required to compute Preventive Maintenance Cost)
   Number of PM Activities Per MM
   Time to Perform PM in Minutes
   PM FRU Cost Per MM
   PM Non-FRU Cost Per MM Parts Cost Per MM The Product Parts Cost Per MM is the sum of the parts cost per MM values for all product FRUs. There is a takedown percentage for the cost in years 2 and 3.

FRU Parts Cost Per MM=(FRU Cost)×(FRU Quantity)×(FRU Replacement Rate)

Product Parts Cost Per PM=sum over all FRUs: {(FRU Parts Cost Per MM)}

Year 1 Parts Cost Per MM=Product Parts Cost Per PM

Year 2 Parts Cost Per MM=(Product Parts Cost Per PM)×(1−(0.01×(Brand Parts Takedown Percentage))

Year 3 Parts Cost Per MM=(Product Parts Cost Per PM)×(1−(0.01×(Brand Parts Takedown Percentage))

Labor Cost Per MM

The Product Labor Cost Per MM is the sum of the Product FRU Replacement Labor Cost Per MM and the Product No-Parts Cost Per MM. There is a takedown percentage for the cost in years 2 and 3.

The Product FRU Replacement Labor Cost Per MM is the sum of the service labor cost per MM for all product FRUs. It is computed as follows:

FRU-Index=1, if FRU is Tier 1 CRU 2, if FRU is Tier 2 CRU 3, if FRU is non-CRU

FRU Per-Incident Labor Rate For Channel N=Service Channel Labor Rates table cell value for FRU-Index column and channel N row FRU Service Distribution Fraction For Channel N=Service Channel Distribution Fractions table cell value in FRU-Index column and channel N row FRU Replacement Labor Cost Per MM =
   sum over all service channels: {
      (FRU Per-Incident Labor Rate For Channel N) ×
      (FRU Service Distribution Fraction For Channel N) ×
      (FRU Replacement Rate Per MM) ×
      (FRU Quantity) }

Product FRU Replacement Labor Cost Per MM=sum over all FRUs: {(FRU Replacement Labor Cost Per MM)}

The Product No-Part Labor Cost Per MM is computed as follows:

Per-Incident No-Part Labor Rate for Channel N=Service Channel Labor Rate Table cell value in the "Non-CRU and No-Part" column and channel N row No-Part Distribution Fraction for Channel N=Service Channel Distribution Fractions Table cell value in the "All FRUs and No-Part" column and channel N row Product No-Part Labor Cost Per MM=(No-Part Rate Per MM)×(sum over all service channels: {(Per-Incident No-Part Labor Rate for Channel N)×(No-Part Distribution Fraction for Channel N)})

Product Labor Cost Per MM=(Product FRU Replacement Labor Cost Per MM)+(Product No-Part Labor Cost Per MM)

The Years 1, 2, and 3 Labor Cost Per MM are computed as follows:

Year 1 Labor Cost Per MM=(Product Labor Cost Per MM)

Year 2 Parts Cost Per MM=(Product Labor Cost Per MM)×(1−(0.01×(Brand Labor Takedown Percentage))

Year 3 Parts Cost Per MM=(Product Labor Cost Per MM)×(1−(0.01×(Brand Labor Takedown Percentage))

Preventive Maintenance Cost Per MM

The Preventive Maintenance Cost Per MM uses the following variables computed in the PM Assessment:

Total PM FRU Cost Per MM
Total PM non-FRU Cost Per MM
Total PM Labor Cost Per MM The Preventive Maintenance Cost Per MM is assumed fixed over years 1, 2, and 3, and is computed as follows:

Preventive Maintenance Cost Per MM (Year 1, 2, and 3)=(Total PM FRU Cost Per MM)+(Total PM Non-FRU Cost Per MM)+(Total PM Labor Cost Per MM)}

Microcode Maintenance Cost Per MM

The Microcode Maintenance Cost Per MM is assumed fixed over years 1, 2, and 3, and is computed as follows:

If (CE Onsite Labor Rate) is per-hour:

Maintenance Activity Minutes Per Year=(Number of Maintenance Activities Per Year)×(Maintenance Activity Time in Minutes)

CE Travel Minutes Per Year=(Number of Maintenance Activities Per Year Requiring Travel)×(Brand CE Travel Time)

Microcode Maintenance Hours Per Year=((Maintenance Activity Minutes Per Year)+(CE Travel Minutes Per Year))/60

Microcode Maintenance Cost Per MM (Year 1, 2, and 3)=(Microcode Maintenance Hours Per Year)× (CE Onsite Non-CRU Per-Hour Labor Rate)/12

If (CE Onsite Labor Rate) is per-incident:

Microcode Maintenance Cost Per MM (Year 1, 2, and 3)=(Number of Maintenance Activities Per Year)×(CE Onsite Non-CRU Per-Incident Labor Rate)/12

Parts Distribution Cost Per MM

The Product Parts Distribution Cost Per MM is the sum of the parts cost per MM values for all product FRUs. The cost is constant over three years.

Parts Distribution Per-Incident Cost for Channel N=Service Channel Parts Distribution Cost Table cell value for channel N FRU Parts Distribution Cost Per MM=sum over all service channels: {(Parts Distribution Per-Incident Cost for Channel N)×(FRU Replacement Rate)×(FRU Quantity)}

Product Parts Distribution Cost Per MM=sum over all FRUs: {(FRU Parts Distribution Cost Per MM)}

Parts Cost Per MM for Years 1, 2, and 3=(Product Parts Distribution Cost Per MM)

Call Center Cost Per MM

The Product Call Center Cost Per MM is the sum of the call center cost per MM values for all product FRUs. The cost is constant over three years.

FRU Call Center Cost Per MM=(Call Center Cost Per Minute)×(Product FRU Average PD PIT)×(FRU Replacement Rate Per MM)×(FRU Quantity)

Product Call Center Cost Per MM=sum over all FRUs: {(FRU Call Center Cost Per MM)}

Call Center Cost Per MM for Years 1, 2, and 3=(Product Call Center Cost Per MM)

Warranty Cost

The warranty cost is the total cost of the following items incurred during a warranty period.

Parts Cost
Labor Cost
Preventive Maintenance Cost
Microcode Maintenance Cost
Parts Distribution Cost Note that warranty cost includes the same items as Projected Service Cost except for Call Center Cost. The parts warranty period applies to Parts Cost and Parts Distribution Cost, whereas the labor warranty period applies to the other three costs.

The computation of warranty cost uses the following two product parameters:

Parts Warranty Period (in months)
Labor Warranty Period (in months)

The warranty cost is computed as follows:

Parts Year 1 Months=min(Parts Warranty Period, 12)

Parts Year 2 Months=min(max(((Parts Warranty Period)−12), 0), 12)

Parts Year 3 Months=min(max(((Parts Warranty Period)−24), 0), 12)

Labor Year 1 Months=min(Parts Warranty Period, 12)

Labor Year 2 Months=min(max(((Labor Warranty Period)−12), 0), 12)

Labor Year 3 Months=min(max(((Labor Warranty Period)−24), 0), 12)

Warranty Cost=(sum over three years: {(Year $n$ Parts Cost Per MM)×(Parts Year $n$ Months)})+(sum over three years: {(Year $n$ Labor Cost Per MM)× (Labor Year $n$ Months)})+((Preventive Maintenance Cost Per MM)×(Labor Warranty Period))+ ((Microcode Maintenance Cost)×(Labor Warranty Period))+((Parts Distribution Cost)× (Parts Warranty Period))

Figure 3A:
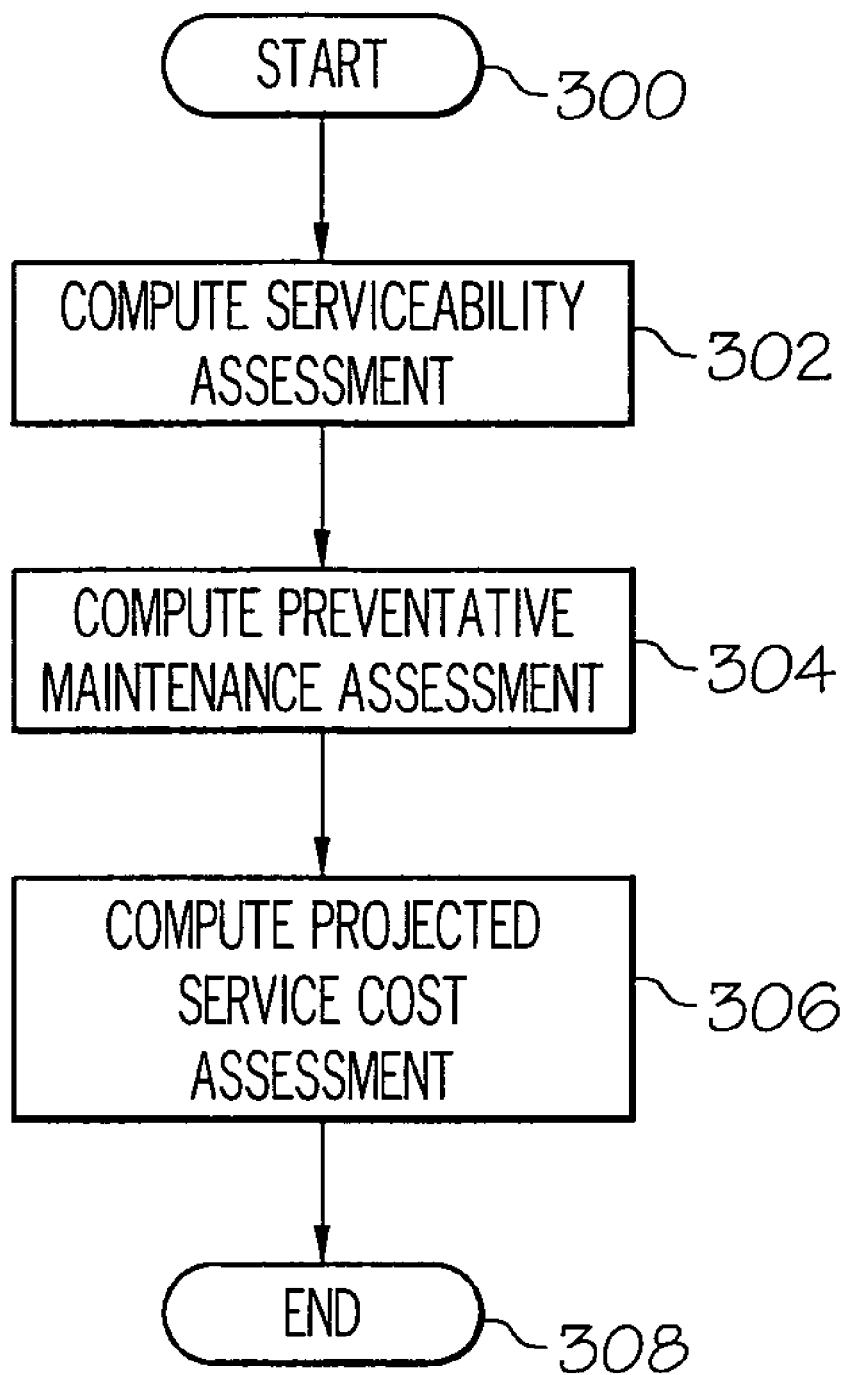
FIG. 3A is a high-level logical flowchart diagram illustrating an exemplary method of computing a projected service cost assessment according to a preferred embodiment of the present invention.

FIG. 3A is a high-level logical flowchart diagram depicting an exemplary method of computing a projected service cost assessment according to a preferred embodiment of the present invention. As illustrated, the process begins at step 300 and proceeds to step 302, which depicts SAT 210 computing a serviceability assessment of a system, described herein in more detail in conjunction with FIG. 3B. The process continues to step 304, which illustrates SAT 210 computing a preventative maintenance assessment. The process proceeds to step 306, which depicts SAT 306 computing a projected service cost assessment, with the results from the calculations illustrated in steps 302 and 304. The process continues to step 308, which illustrates the process ending.

Figure 3B:
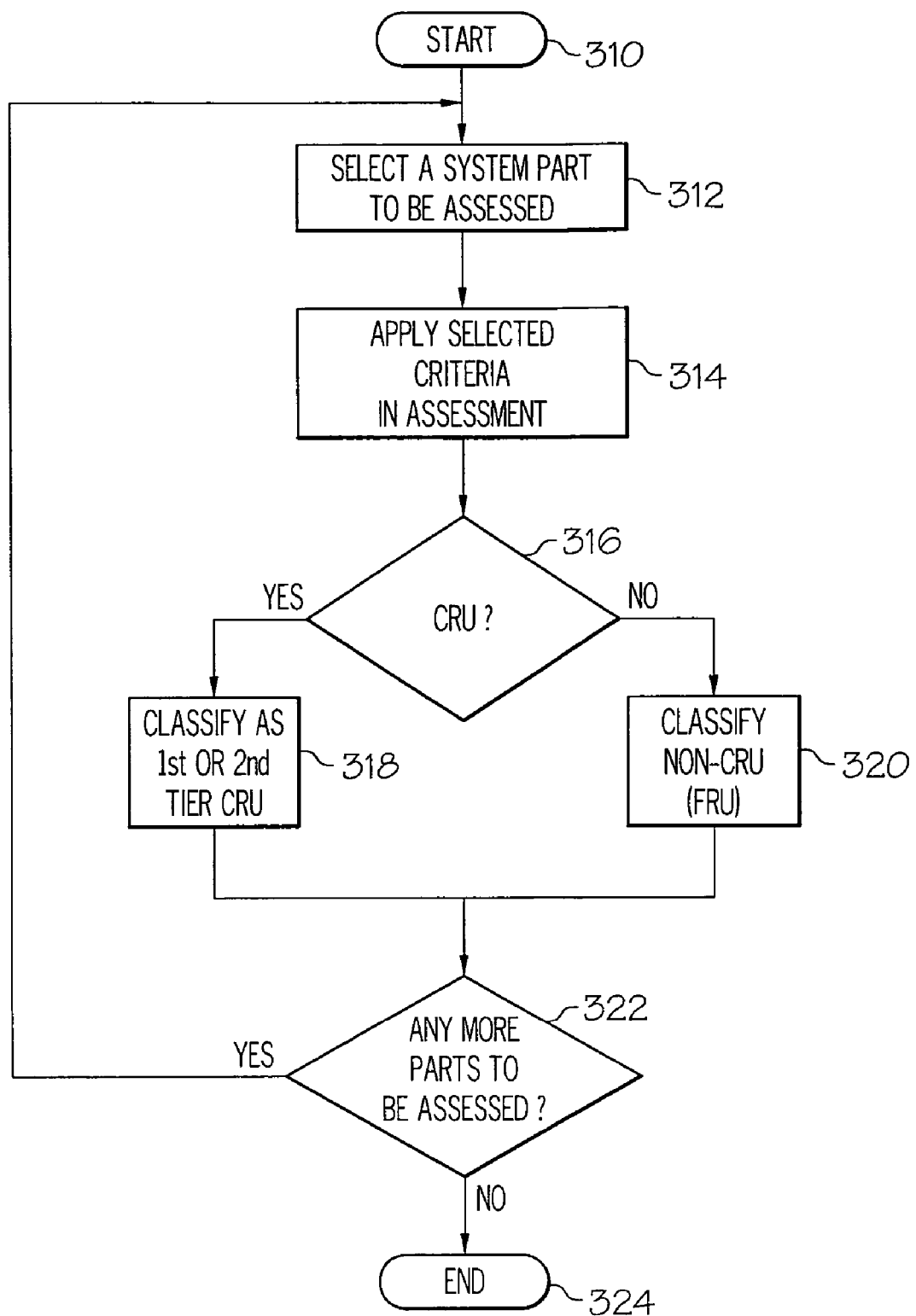
FIG. 3B is a high-level logical flowchart diagram depicting an exemplary method of computing a serviceability assessment according to a preferred embodiment of the present invention.

FIG. 3B is a high-level logical flowchart diagram illustrating an exemplary method computing a serviceability assessment according to a preferred embodiment of the present invention. The process begins at step 310 and proceeds to step 312, which illustrates a selection of a system part to be assessed. The process continues to step 314, which depicts serviceability assessment tool (SAT) 210 applying selected criteria in the assessment of the selected part. While any criteria may be utilized to assess the selected part, a preferred embodiment of the present invention utilizes the previously discussed customer replaceable unit (CRU) criteria.

The process proceeds to step 316, which illustrates SAT 210 determining whether the selected part is considered a customer replaceable unit (CRU) according to the selected CRU criteria. If the selected part is considered a CRU, the process continues to step 308, which illustrates SAT 210 classifying the CRU as a $1^{st}$ Tier or a $2^{nd}$ Tier CRU.

Returning to step 316, if SAT 210 determines that the selected part is not a CRU, the selected part is classified as a non-CRU (and considered a FRU), as depicted in step 320. The process continues to step 322, which illustrates SAT 210 determining whether there are any more parts to be assessed. If there are more parts to be assessed, the process returns to step 312 and proceeds in an iterative fashion. The process then ends, as illustrated in step 324.

As disclosed, the present invention includes a method, apparatus, and computer-usable medium for computing a serviceability assessment, calculating a preventative maintenance assessment, and in response to computing the serviceability and preventative maintenance assessments, computing a projected service cost assessment. A preferred embodiment of the present invention includes a processor, a data bus, and a computer-readable medium including a serviceability assessment tool. The serviceability assessment tool further includes a serviceability assessment module, a hardware installation assessment module, a preventative maintenance assessment module, and a projected service cost assessment module.

In a preferred embodiment of the present invention, a projected service cost assessment is calculated by first assessing the serviceability of each part of the system. The system parts are classified as $1^{st}$ tier consumer replaceable units (CRUs), $2^{nd}$ tier CRUs, or non-CRUs. The cost of preventative maintenance of the system is assessed. The projected service cost assessment is calculated from the result of the serviceability assessment and the preventative maintenance assessment.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Thus, the method described herein, and in particular as shown and described in FIG. 3, can be deployed as a process software from service provider server 156 to client computer 152.

Figure 4A:
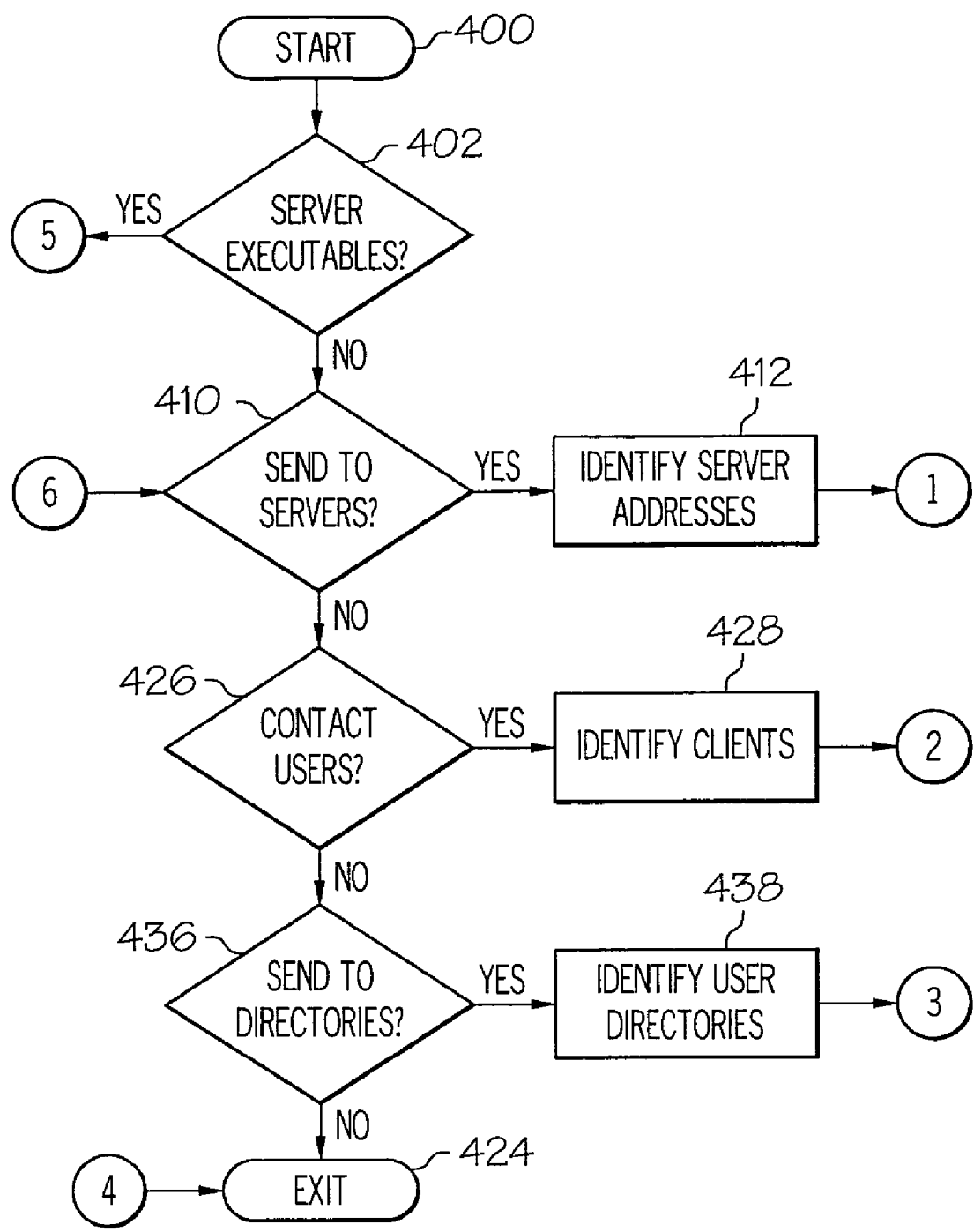
FIGS. 4A-B show a flow-chart of steps taken to deploy software capable of executing the steps shown and described in FIGS. 3A-B.
Figure 4B:
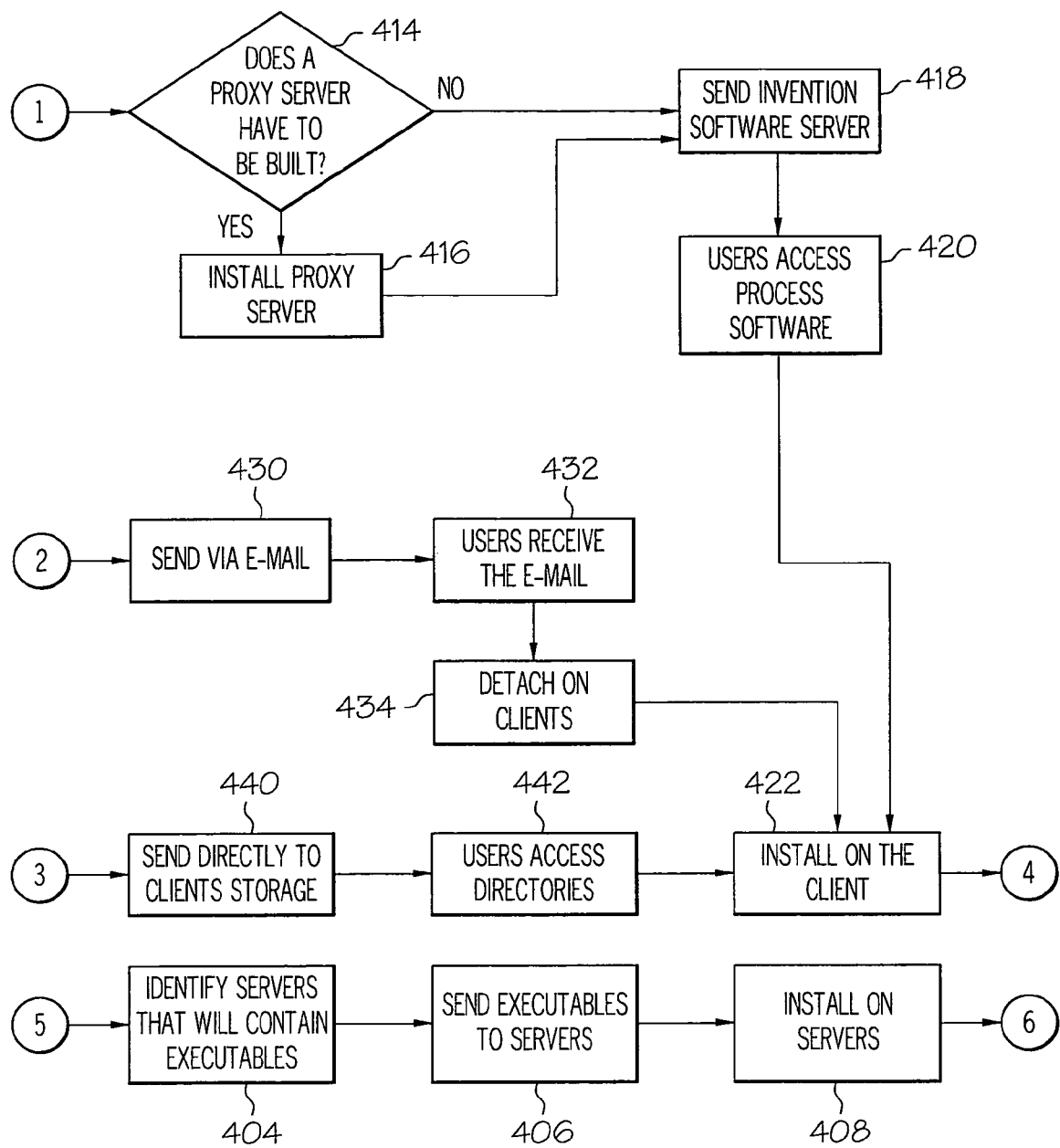

Referring then to FIG. 4, step 400 begins the deployment of the process software. The first thing is to determine if there are any programs that will reside on a server or servers when the process software is executed (query block 402). If this is the case, then the servers that will contain the executables are identified (block 404). The process software for the server or servers is transferred directly to the servers' storage via File Transfer Protocol (FTP) or some other protocol or by copying though the use of a shared file system (block 406). The process software is then installed on the servers (block 408).

Next, a determination is made on whether the process software is to be deployed by having users access the process software on a server or servers (query block 410). If the users are to access the process software on servers, then the server addresses that will store the process software are identified (block 412).

A determination is made if a proxy server is to be built (query block 414) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 416). The process software is sent to the servers either via a protocol such as FTP or it is copied directly from the source files to the server files via file sharing (block 418). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 420). Another embodiment is to have the servers automatically copy the process software to each client and then run the installation program for the process software at each client computer. The user executes the program that installs the process software on his client computer (block 422) then exits the process (terminator block 424).

In query step 426, a determination is made whether the process software is to be deployed by sending the process software to users via e-mail. The set of users where the process software will be deployed are identified together with the addresses of the user client computers (block 428). The process software is sent via e-mail to each of the users' client computers (block 430). The users then receive the e-mail (block 432) and then detach the process software from the e-mail to a directory on their client computers (block 434). The user executes the program that installs the process software on his client computer (block 422) then exits the process (terminator block 424).

Lastly a determination is made on whether to the process software will be sent directly to user directories on their client computers (query block 436). If so, the user directories are identified (block 438). The process software is transferred directly to the user's client computer directory (block 440). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 442). The user executes the program that installs the process software on his client computer (block 422) and then exits the process (terminator block 424).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 5A:
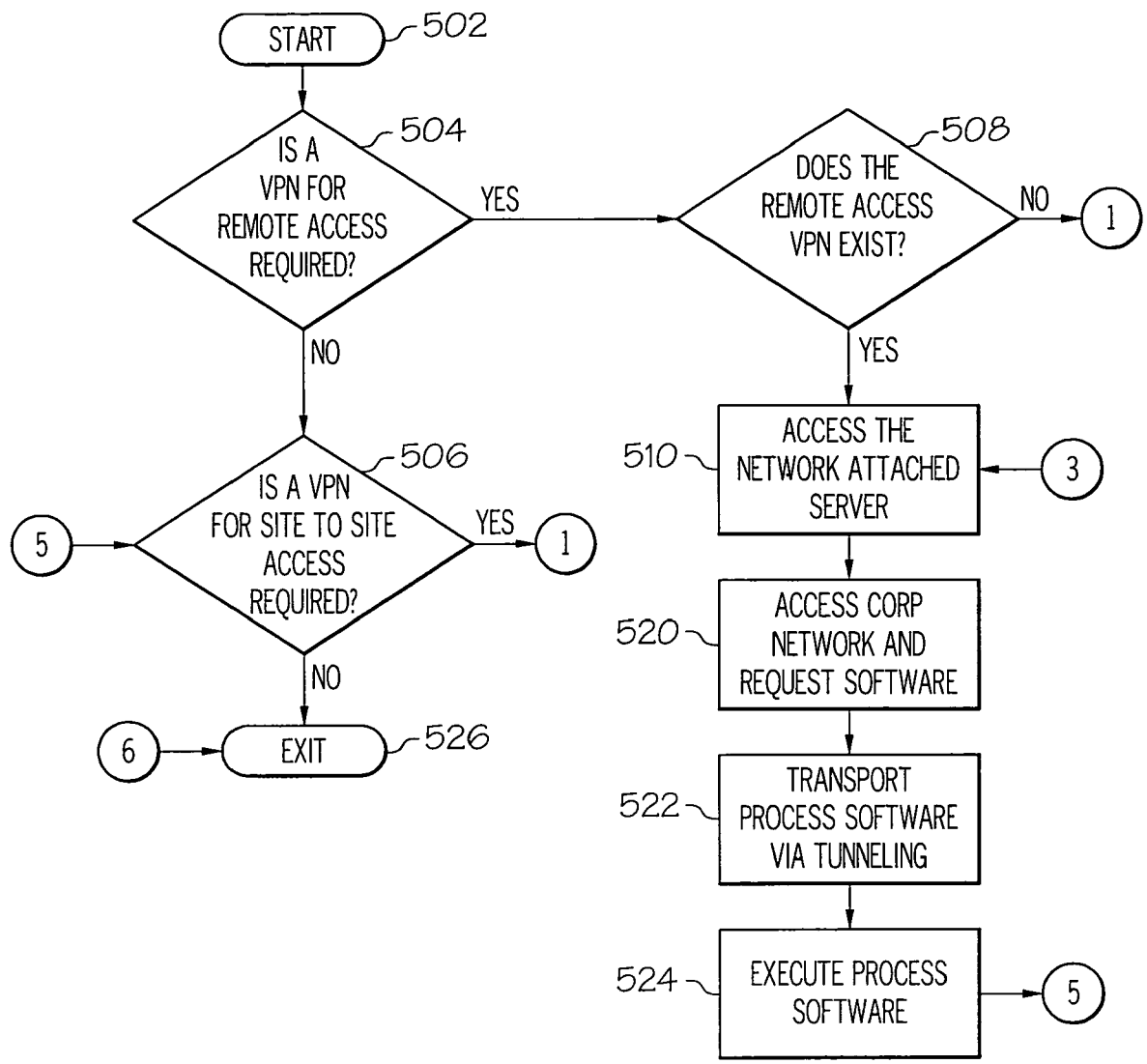
FIGS. 5A-C show a flow-chart of steps taken to deploy in a Virtual Private Network (VPN) software that is capable of executing the steps shown and described in FIGS. 3A-B.
Figure 5B:
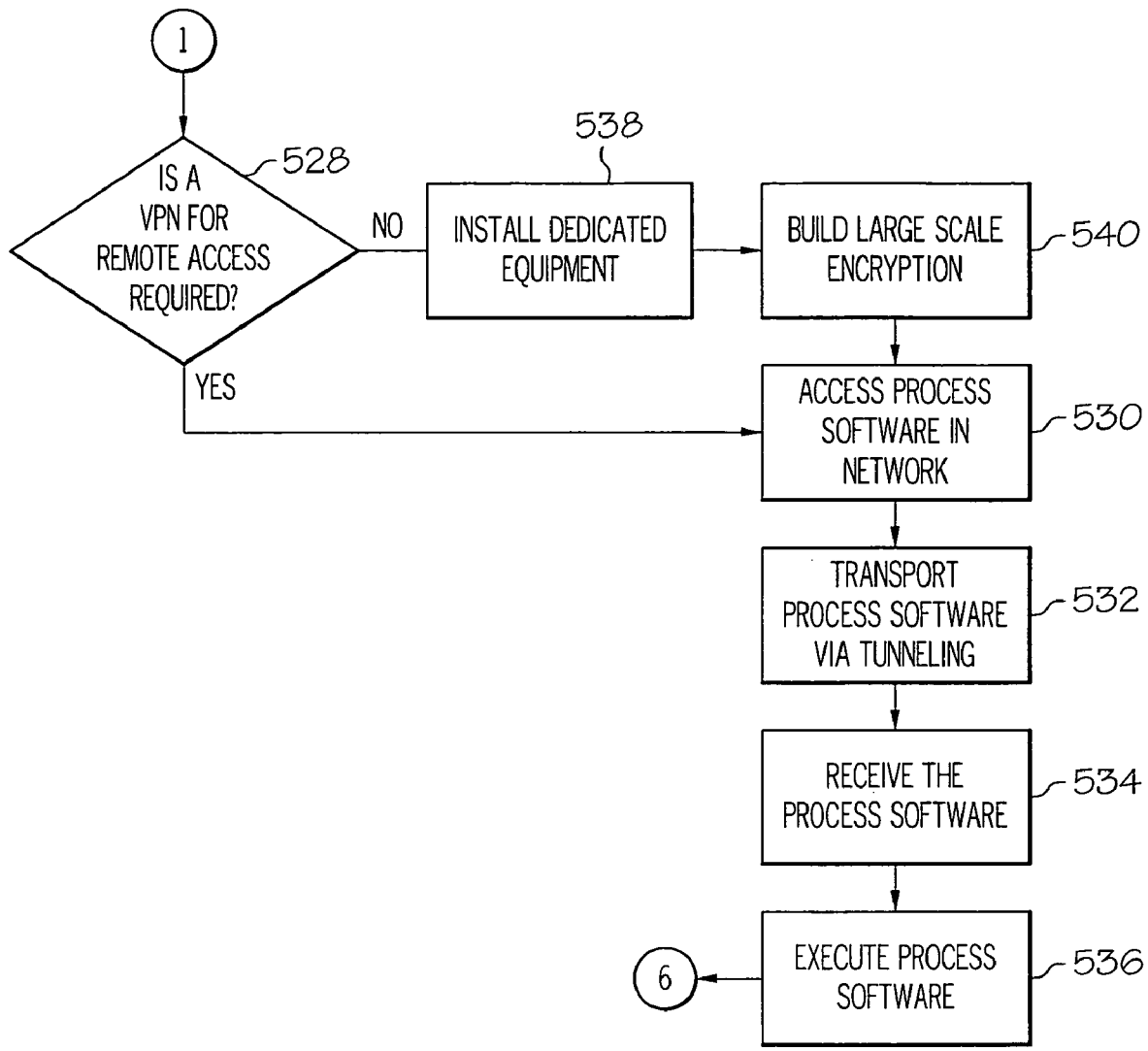
Figure 5C:
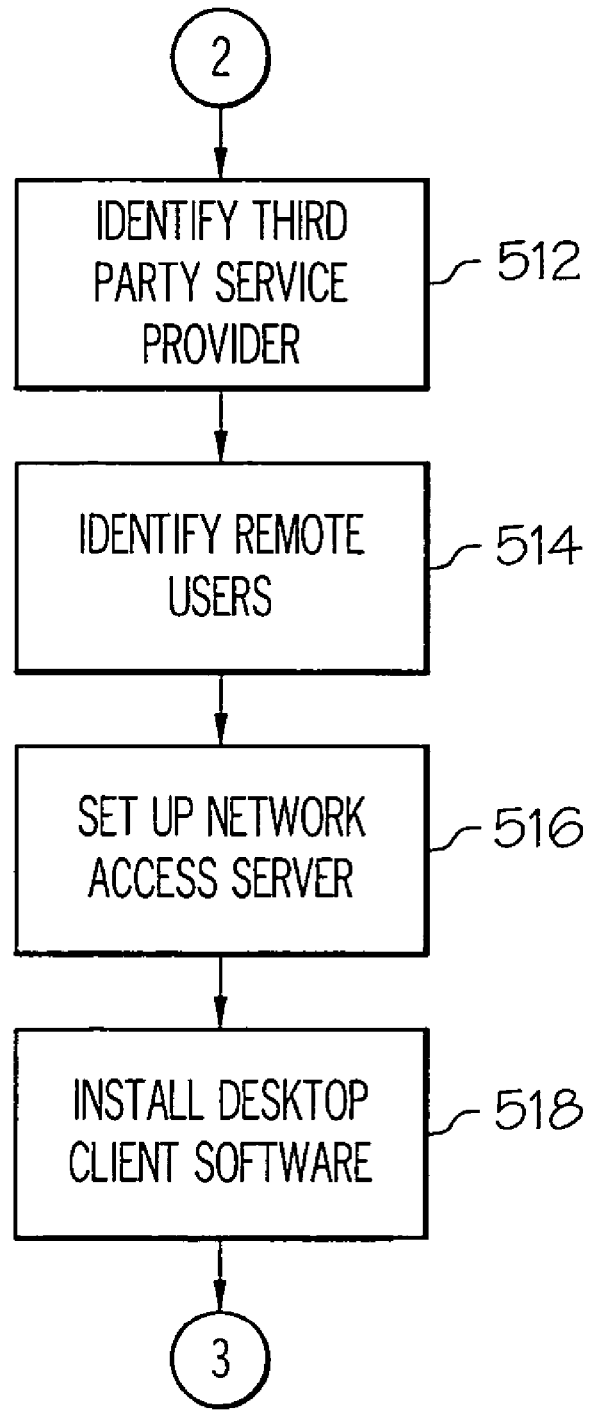

The process for such VPN deployment is described in FIG. 5. Initiator block 502 begins the Virtual Private Network (VPN) process. A determination is made to see if a VPN for remote access is required (query block 504). If it is not required, then proceed to query block 506. If it is required, then determine if the remote access VPN exists (query block 508).

If a VPN does exist, then proceed to block 510. Otherwise identify a third party provider that will provide the secure, encrypted connections between the company's private network and the company's remote users (block 512). The company's remote users are identified (block 514). The third party provider then sets up a network access server (NAS) (block 516) that allows the remote users to dial a toll free number or attach directly via a broadband modem to access, download and install the desktop client software for the remote-access VPN (block 518).

After the remote access VPN has been built or if it has been previously installed, the remote users can access the process software by dialing into the NAS or attaching directly via a cable or DSL modem into the NAS (block 510). This allows entry into the corporate network where the process software is accessed (block 520). The process software is transported to the remote user's desktop over the network via tunneling. That is, the process software is divided into packets and each packet including the data and protocol is placed within another packet (block 522). When the process software arrives at the remote user's desktop, it is removed from the packets, reconstituted and then is executed on the remote user's desktop (block 524).

A determination is then made to see if a VPN for site to site access is required (query block 506). If it is not required, then proceed to exit the process (terminator block 526). Otherwise, determine if the site to site VPN exists (query block 528). If it does exist, then proceed to block 530. Otherwise, install the dedicated equipment required to establish a site to site VPN (block 538). Then build the large scale encryption into the VPN (block 540).

After the site to site VPN has been built or if it had been previously established, the users access the process software via the VPN (block 530). The process software is transported to the site users over the network via tunneling (block 532). That is the process software is divided into packets and each packet including the data and protocol is placed within another packet (block 534). When the process software arrives at the remote user's desktop, it is removed from the packets, reconstituted and is executed on the site user's desktop (block 536). The process then ends at terminator block 526.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 6A:
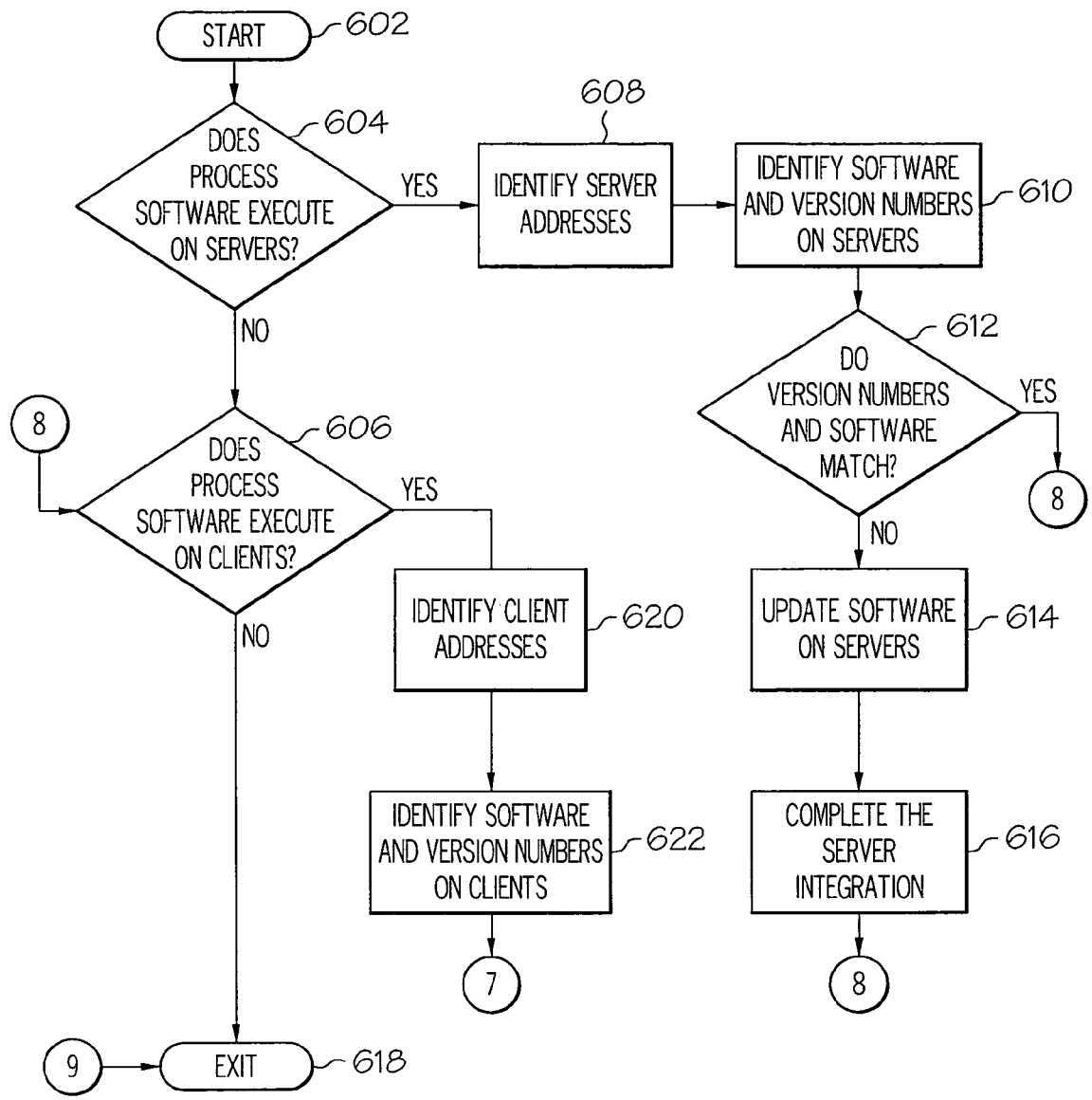
FIGS. 6A-B show a flow-chart showing steps taken to integrate into a computer system software that is capable of executing the steps shown and described in FIGS. 3A-B.
Figure 6B:
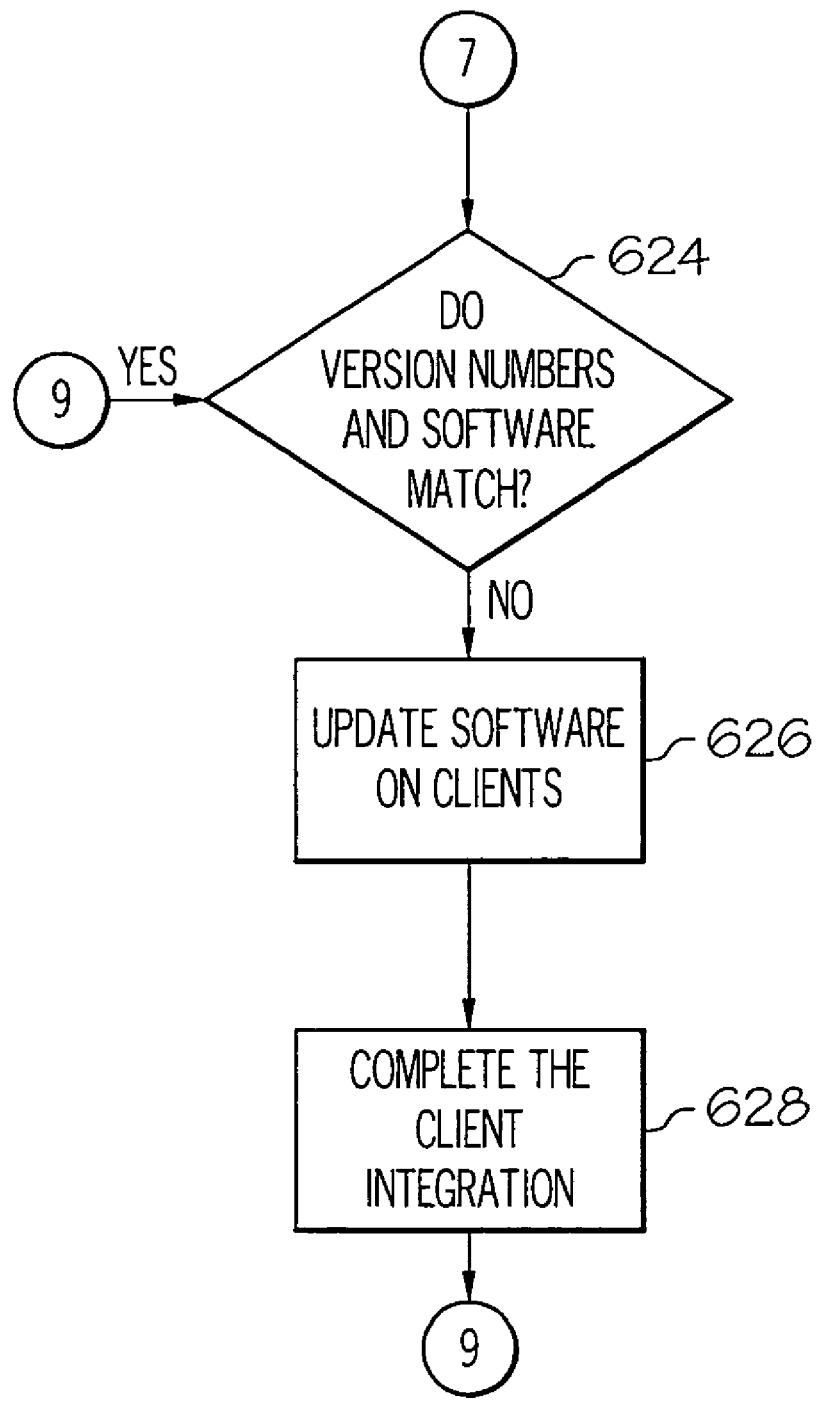

For a high-level description of this process, reference is now made to FIG. 6. Initiator block 602 begins the integration of the process software. The first tiling is to determine if there are any process software programs that will execute on a server or servers (block 604). If this is not the case, then integration proceeds to query block 606. If this is the case, then the server addresses are identified (block 608). The servers are checked to see if they contain software that includes the operating system (OS), applications, and network operating systems (NOS), together with their version numbers, which have been tested with the process software (block 610). The servers are also checked to determine if there is any missing software that is required by the process software in block 610.

A determination is made if the version numbers match the version numbers of OS, applications and NOS that have been tested with the process software (block 612). If all of the versions match and there is no missing required software the integration continues in query block 606.

If one or more of the version numbers do not match, then the unmatched versions are updated on the server or servers with the correct versions (block 614). Additionally, if there is missing required software, then it is updated on the server or servers in the step shown in block 614. The server integration is completed by installing the process software (block 616).

The step shown in query block 606, which follows either the steps shown in block 604, 612 or 616 determines if there are any programs of the process software that will execute on the clients. If no process software programs execute on the clients the integration proceeds to terminator block 618 and exits. If this not the case, then the client addresses are identified as shown in block 620.

The clients are checked to see if they contain software that includes the operating system (OS), applications, and network operating systems (NOS), together with their version numbers, which have been tested with the process software (block 622). The clients are also checked to determine if there is any missing software that is required by the process software in the step described by block 622.

A determination is made is the version numbers match the version numbers of OS, applications and NOS that have been tested with the process software (query block 624). If all of the versions match and there is no missing required software, then the integration proceeds to terminator block 618 and exits.

If one or more of the version numbers do not match, then the unmatched versions are updated on the clients with the correct versions (block 626). In addition, if there is missing required software then it is updated on the clients (also block 626). The client integration is completed by installing the process software on the clients (block 628). The integration proceeds to terminator block 618 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 7A:
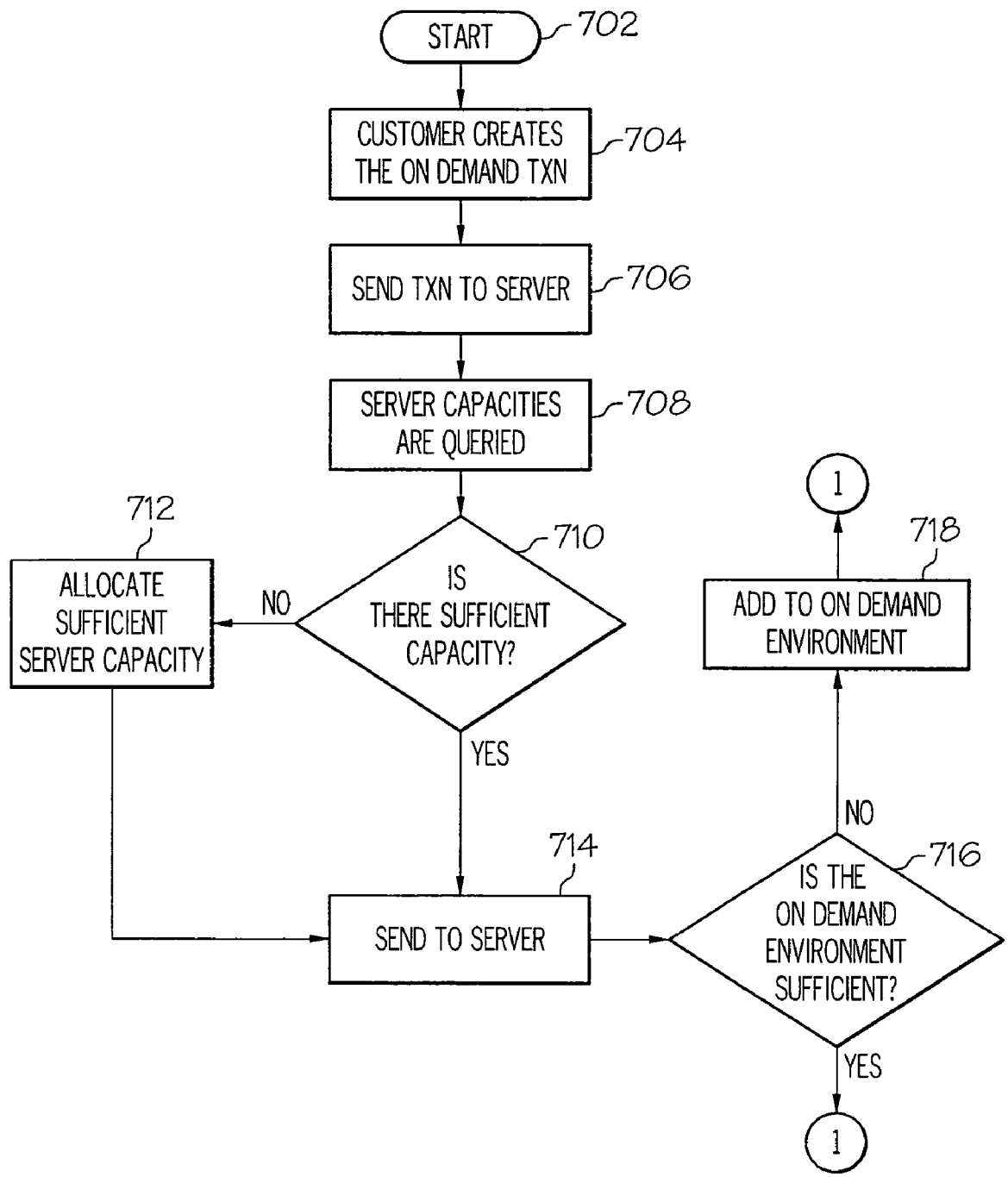
FIGS. 7A-B show a flow-chart showing steps taken to execute the steps shown and described in FIGS. 3A-B using an on-demand service provider.
Figure 7B:
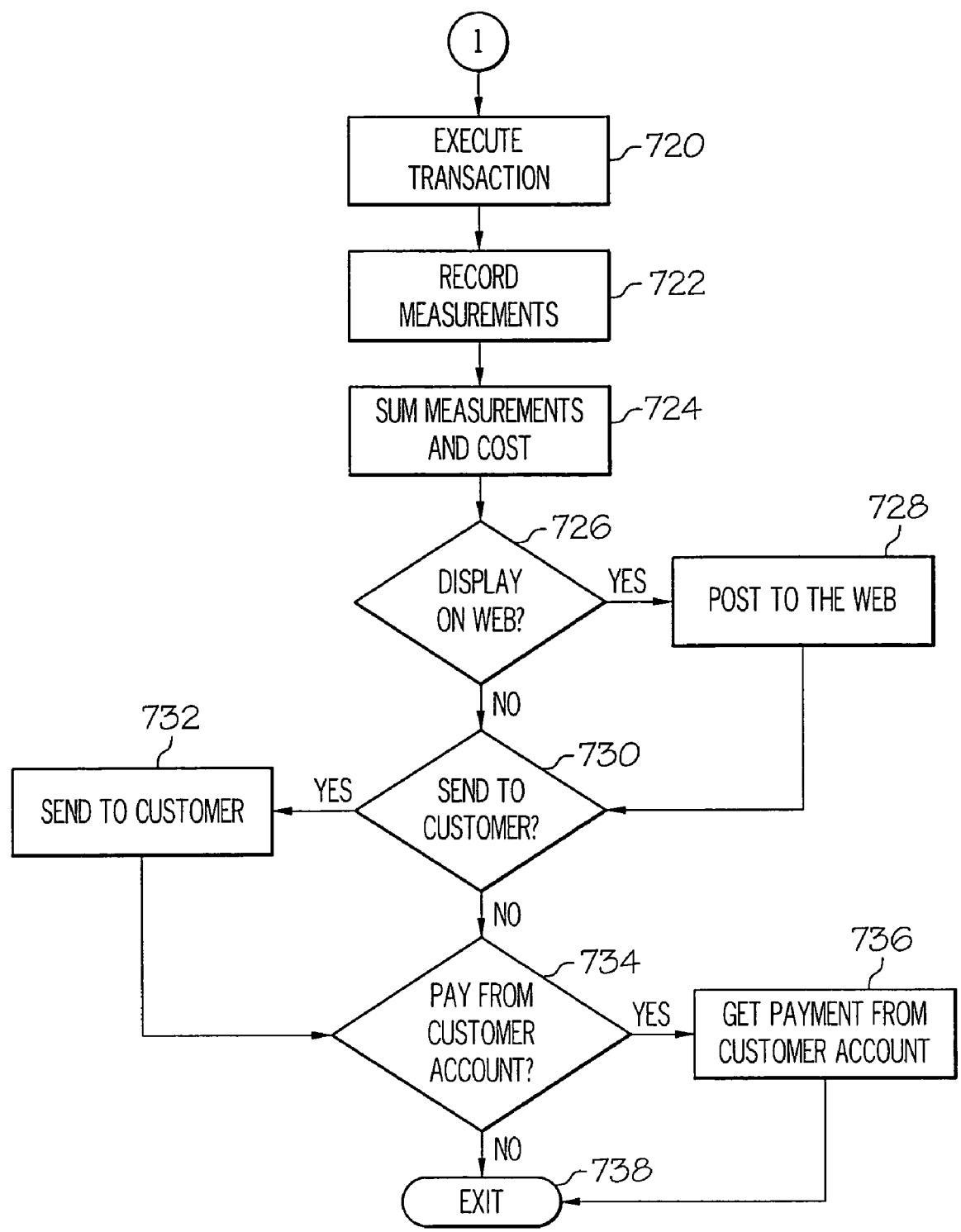

With reference now to FIG. 7, initiator block 702 begins the On Demand process. A transaction is created than contains the unique customer identification, the requested service type and any service parameters that further, specify the type of service (block 704). The transaction is then sent to the main server (block 706). In an On Demand environment the main server can initially be the only server, then as capacity is consumed other servers are added to the On Demand environment.

The server central processing unit (CPU) capacities in the On Demand environment are queried (block 708). The CPU requirement of the transaction is estimated, then the servers available CPU capacity in the On Demand environment are compared to the transaction CPU requirement to see if there is sufficient CPU available capacity in any server to process the transaction (query block 710). If there is not sufficient server CPU available capacity, then additional server CPU capacity is allocated to process the transaction (block 712). If there was already sufficient available CPU capacity then the transaction is sent to a selected server (block 714).

Before executing the transaction, a check is made of the remaining On Demand environment to determine if the environment has sufficient available capacity for processing the transaction. This environment capacity consists of such things as but not limited to network bandwidth, processor memory, storage etc. (block 716). If there is not sufficient available capacity, then capacity will be added to the On Demand environment (block 718). Next the required software to process the transaction is accessed, loaded into memory, then the transaction is executed (block 720).

The usage measurements are recorded (block 722). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 724).

If the customer has requested that the On Demand costs be posted to a web site (query block 726), then they are posted (block 728). If the customer has requested that the On Demand costs be sent via e-mail to a customer address (query block 730), then these costs are sent to the customer (block 732). If the customer has requested that the On Demand costs be paid directly from a customer account (query block 734), then payment is received directly from the customer account (block 736). The On Demand process is then exited at terminator block 738.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data. Also, those with skill in this art will appreciate that the present invention is not limited to data processing systems, but any system or project in which a projected cost assessment may be calculated.

What is claimed is:

1. A computer-implementable method comprising:
    computing a serviceability assessment;
    calculating a preventative maintenance assessment;
    in response to said computing and said calculating, computing a projected service cost assessment;
    selecting a system part among a plurality of system parts to be assessed;
    applying a selected set of criteria to said selected system part;
    classifying said selected system part as a customer replaceable unit (CRU) or a non-customer replaceable unit (Non-CRU); and
    in response to classifying said selected system part as a CRU, determining if said selected system part is a first or second tier CRU.

2. The computer-implementable method according to claim 1, wherein said computing a serviceability assessment further comprises:
    defining a plurality of evaluation questions;
    assigning a plurality of threshold values to enable said classifying said selected system part as said CRU or said non-CRU;
    defining a plurality of calibration constants to indicate a plurality of target values to be met by said plurality of system parts; and
    assigning a plurality of brand parameters to indicate characteristics of a particular supplier of certain system parts among said plurality of system parts.

3. The computer-implementable method according to claim 1, further comprising:
    in response to classifying said selected system part as a Non-CRU, estimating a repair and replacement time for said selected system part.

4. The computer-implementable method according to claim 1, further comprising:
    assessing a cost of hardware installation.

5. A system comprising:
    a processor;
    a data bus coupled to said processor; and
    a computer-usable medium embodying computer code, said computer-usable medium being coupled to said data bus, said computer program code comprising instructions executable by said processor and configured for:
        computing a serviceability assessment;
        calculating a preventative maintenance assessment; and
        in response to said computing and said calculating, computing a projected service cost assessment;
    selecting a system part among a plurality of system parts to be assessed;
    applying a selected set of criteria to said selected system part;
    classifying said selected system part as a customer replaceable unit (CRU) or a non-customer replaceable unit (Non-CRU); and
    in response to classifying said selected system part as a CRU, determining if said selected system part is a first or second tier CRU.

6. The system according to claim 5, wherein said instructions for computing a serviceability assessment are further configured for:
    defining a plurality of evaluation questions;
    assigning a plurality of threshold values to enable said classifying said selected system part as said CRU or said non-CRU;
    defining a plurality of calibration constants to indicate a plurality of target values to be met by said plurality of system parts; and
    assigning a plurality of brand parameters to indicate characteristics of a particular supplier of certain system parts among said plurality of system parts.

7. The system according to claim 5, wherein said instructions are further configured for:
    in response to classifying said selected system part as a Non-CRU, estimating a repair and replacement time for said selected system part.

8. The system according to claim 5, wherein said instructions are further configured for:
    assessing a cost of hardware installation.

9. A computer-usable medium embodying computer program code, said computer program code comprising computer executable instructions configured for:
    computing a serviceability assessment;
    calculating a preventative maintenance assessment;
    in response to said computing and said calculating, computing a projected service cost assessment;
    selecting a system part among a plurality of system parts to be assessed;

applying a selected set of criteria to said selected system part;

classifying said selected system part as a customer replaceable unit (CRU) or a non-customer replaceable unit (Non-CRU); and in response to classifying said selected system part as a CRU, determining if said selected system part is a first or second tier CRU.

10. The computer-usable medium according to claim 9, wherein said embodied computer program code for said computing a serviceability assessment further comprises computer executable instructions configured for:

defining a plurality of evaluation questions;

assigning a plurality of threshold values to enable said classifying said selected system part as said CRU or said non-CRU;

defining a plurality of calibration constants to indicate a plurality of target values to be met by said plurality of system parts; and assigning a plurality of brand parameters to indicate characteristics of a particular supplier of certain system parts among said plurality of system parts.

11. The computer-usable medium according to claim 9, wherein said embodied computer program code further comprises computer executable instructions configured for:

in response to classifying said selected system part as a Non-CRU, estimating a repair and replacement time for said selected system part.

12. The computer-usable medium according to claim 9, wherein said embodied computer program code further comprises computer executable instructions configured for:

assessing a cost of hardware installation.

13. The computer-usable medium according to claim 9, wherein said computer executable instructions are deployable to a client computer from a server at a remote location.

14. The computer-usable medium according to claim 9, wherein said computer executable instructions are provided by a service provider to a customer on an on-demand basis.

* * * * *